US012793672B2

(12) United States Patent
Son et al.

(10) Patent No.: US 12,793,672 B2
(45) Date of Patent: Nov. 10, 2026

(54) SIGNAL PROCESSING DEVICE AND IMAGE DISPLAY APPARATUS INCLUDING SAME

(71) Applicant: LG ELECTRONICS INC., Seoul (KR)

(72) Inventors: Jeongil Son, Seoul (KR); Kibeom Kim, Seoul (KR); Jaeyoun Jung, Seoul (KR); Junghyun Son, Seoul (KR); Yongjoo Kim, Seoul (KR); Hwajeong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 923 days.

(21) Appl. No.: 18/024,020

(22) PCT Filed: Aug. 28, 2020

(86) PCT No.: PCT/KR2020/011553

§ 371 (c)(1),
(2) Date: Feb. 28, 2023

(87) PCT Pub. No.: WO2022/045407

PCT Pub. Date: Mar. 3, 2022

(65) Prior Publication Data

US 2023/0269417 A1 Aug. 24, 2023

(51) Int. Cl.
*G09G 5/00* (2006.01)
*H04N 21/426* (2011.01)

(52) U.S. Cl.
CPC ....... *G09G 5/006* (2013.01); *H04N 21/42607* (2013.01)

(58) Field of Classification Search
CPC ............... G09G 5/006; H04N 21/4182; H04N 21/42607; H04N 21/4343; H04N 21/44004
See application file for complete search history.

(56) References Cited

U.S. PATENT DOCUMENTS 8,762,564 B1 * 6/2014 Philpott ........... H04N 21/64322 709/219
10,034,042 B2 * 7/2018 Yamagishi ......... H04N 21/4384
(Continued)

FOREIGN PATENT DOCUMENTS

KR 101555792 9/2015
KR 101737325 5/2017
(Continued)

OTHER PUBLICATIONS

PCT International Application No. PCT/KR2020/011553, International Search Report dated May 24, 2021, 4 pages.

*Primary Examiner* — Michael B. Pierorazio
(74) *Attorney, Agent, or Firm* — LEE, HONG, DEGERMAN, KANG & WAIMEY

(57) ABSTRACT

The present invention relates to a signal processing device and an image display device including same. The signal processing device according to an embodiment of the present invention comprises: a streaming data processing unit for receiving streaming data, generating list information including information related to a plurality of first unit of data, on the basis of the received streaming data, and outputting the generated list information; and a decoder for receiving the list information and decoding the plurality of data of the first unit, on the basis of the list information, wherein the streaming data processing unit outputs data decoded by the decoder. Accordingly, the number of inter process communications can be reduced during signal processing of streaming data.

19 Claims, 18 Drawing Sheets

(56) References Cited

U.S. PATENT DOCUMENTS

| | | | | |
|---|---|---|---|---|
| 10,171,854 | B2 * | 1/2019 | Yamagishi | H04N 21/8456 |
| 2003/0204614 | A1 * | 10/2003 | Spio | H04L 12/1827 709/231 |
| 2006/0245738 | A1 * | 11/2006 | Lee | H04N 21/6125 386/346 |
| 2007/0199020 | A1 * | 8/2007 | Kim | H04N 21/426 725/62 |
| 2007/0252740 | A1 * | 11/2007 | Lee | H04N 21/8126 348/E5.108 |
| 2008/0177865 | A1 * | 7/2008 | Heo | H04L 69/22 709/219 |
| 2009/0025027 | A1 * | 1/2009 | Craner | H04N 21/2385 725/116 |
| 2009/0031384 | A1 * | 1/2009 | Brooks | H04N 21/2402 725/127 |
| 2009/0100459 | A1 * | 4/2009 | Riedl | H04N 21/2405 725/35 |
| 2009/0150943 | A1 * | 6/2009 | Vasudevan | H04N 21/6405 725/86 |
| 2010/0086020 | A1 * | 4/2010 | Schlack | H04L 67/61 375/240.01 |
| 2010/0260254 | A1 * | 10/2010 | Kimmich | H04N 19/164 375/240 |
| 2011/0188439 | A1 * | 8/2011 | Mao | H04N 21/6405 370/312 |
| 2011/0197239 | A1 * | 8/2011 | Schlack | H04N 21/2393 725/95 |
| 2011/0255555 | A1 * | 10/2011 | Alexander | H04N 21/239 370/468 |
| 2012/0185907 | A1 * | 7/2012 | Park | H04N 21/242 725/110 |
| 2012/0331513 | A1 * | 12/2012 | Yamagishi | H04N 21/2362 725/95 |
| 2013/0091521 | A1 * | 4/2013 | Phillips | H04N 21/23424 725/35 |
| 2014/0230003 | A1 * | 8/2014 | Ma | H04N 21/4147 725/115 |
| 2014/0282766 | A1 * | 9/2014 | Good | H04N 21/2225 725/93 |
| 2014/0282777 | A1 * | 9/2014 | Gonder | H04N 21/26616 725/116 |
| 2015/0358662 | A1 * | 12/2015 | Drouin | H04N 21/2225 725/97 |
| 2016/0192001 | A1 * | 6/2016 | White | H04N 21/26258 725/110 |
| 2018/0139476 | A1 * | 5/2018 | Deshpande | H04N 21/435 |

FOREIGN PATENT DOCUMENTS

| | | |
|---|---|---|
| KR | 1020180001001 | 1/2018 |
| KR | 1020200051450 | 5/2020 |

* cited by examiner

SIGNAL PROCESSING DEVICE AND IMAGE DISPLAY APPARATUS INCLUDING SAME

CROSS-REFERENCE TO RELATED APPLICATIONS

This application is the National Stage filing under 35 U.S.C. 371 of International Application No. PCT/KR2020/011553, filed on Aug. 28, 2020, the contents of which are all incorporated by reference herein in their entirety.

BACKGROUND

1. Field

The present disclosure relates to a signal processing device and an image display apparatus including the same, and more particularly, to a signal processing device capable of reducing the number of inter process communications during signal processing of the streaming data and an image display apparatus including the same.

2. Description of the Related Art

A signal processing device is a device that performs signal processing on an input image so as to display an image.

For example, the signal processing device may receive various image signals, such as a broadcast signal and an external input signal (e.g., HDMI signal or a streaming signal), perform signal processing based on the received broadcast signal or external input signal, and output a processed image signal to a display.

Meanwhile, when streaming data is received, in order to process the streaming data, the streaming data is split into predetermined units and the data in the predetermined units is processed.

Meanwhile, Korea Patent Laid-open Publication No. 10-2016-0111021 (hereinafter, referred to as related art) discloses that a packet storing a NAL unit, which is a component of encoded data, or a NAL unit fragment obtained by further splitting the NAL unit is generated and transmitted.

However, when data is processed in predetermined units as in the related art, the number of inter process communications (IPC) between a streaming data processor processing the streaming data and a decoder increases by the number of data in the predetermined units.

In particular, when video resolution of the streaming data is high resolution, the number of data in the predetermined units may increase, and as the number of predetermined units increases, resources are wasted and system performance may be degraded. As a result, when displaying an image of streaming data, quality deterioration, such as screen interruption, may occur.

SUMMARY

An object of the present disclosure is to provide a signal processing device capable of reducing the number of inter process communications (IPC) during signal processing of the streaming data and an image display apparatus including the same.

Another object of the present disclosure is to provide a signal processing device capable of reducing screen interruption when displaying an image based on streaming data and an image display apparatus including the same.

Another object of the present disclosure is to provide a signal processing device capable of performing authentication processing on streaming data to display an image based on authenticated streaming data, and an image display apparatus including the same.

In accordance with the present disclosure, the above and other objects may be accomplished by the provision of a signal processing device and an image display apparatus including the same, each including: a streaming data processor configured to receive streaming data, generate list information including information on a plurality of first units of data based on the received streaming data, and output the generated list information; and a decoder configured to receive the list information and decode the plurality of first units of data based on the list information, wherein the streaming data processor is configured to output data decoded by the decoder.

The decoder may decode the plurality of first units of data related to the streaming data based on the information on the first units of data in the list information.

The signal processing device may further include: a memory configured to store the streaming data, wherein the decoder may be configured to split the streaming data from the memory into the first units of data based on the number information and address information of the first units of data in the list information and decode the plurality of first units of data based on the split first units of data.

The signal processing device may further include: a memory configured to store the first units of data related to the streaming data, wherein the decoder may be configured to access the first units of data corresponding to the memory based on the number information and address information of the first units of data in the list information and decode the plurality of first units of data based on the accessed first units of data.

The information on the plurality of first units of data may include number information, address information, and length information of the first units of data.

The information on the plurality of first units of data may further include maximum number information and type information of the first units of data.

The streaming data processor may extract the plurality of first units of data by parsing a second unit of data greater than the first unit, and generate the list information including the information on the plurality of first units of data.

The streaming data processor may convert the first units of data into parameter information and transmit update information of the list information and the parameter information to the decoder.

The streaming data processor may be configured to update at least a portion of the list information with parameter information and transmit the updated parameter information, as the list information, to the decoder.

The streaming data processor may include an authentication processor configured to receive address information of a second unit of data greater than the first unit, extract the plurality of first units of data based on address information of the second unit of data, and generate the list information including information on the plurality of first units of data.

The authentication processor may perform authentication on the streaming data and output the list information after performing the authentication.

The streaming data processor may further include a splitter configured to split image data and meta data from the second unit of data based on the list information from the authentication processor; and an image decoding processor configured to decode the image data split by the splitter using the decoder.

The streaming data processor may further include: a data parser configured to parse the meta data using address information of the meta data split by the splitter; and a sequencer configured to output the image data decoded by the image decoding processor and the meta data parsed by the parser together.

The streaming data processor may further include: a demultiplexer configured to demultiplex the input streaming data and output the demultiplexed second unit of data; a plug-in processor configured to perform plug-in processing on the second unit of data from the demultiplexer; and a parser configured to receive address information of the second unit of data from the plug-in processor and perform parsing on the second unit of data based on the address information of the second unit of data.

The number of communications between the streaming data processor and the decoder may be inversely proportional to the number of first units of data in the list information.

Communication between the streaming data processor and the decoder may be performed once per image frame of the streaming data.

In accordance with an aspect of the present disclosure, the above and other objects may be accomplished by the provision of a signal processing device and an image display apparatus including the same, each including: a streaming data processor configured to receive streaming data, generate list information including information on a plurality of first units of data based on the received streaming data, and output the generated list information; a memory configured to store the first units of data related to the streamlining data; and a decoder configured to receive the list information and decode the plurality of first units of data based on the list information, wherein the streaming data processor is configured to output data decoded by the decoder.

The streaming data processor may include an authentication processor configured to receive address information of a second unit of data greater than the first unit, extract the plurality of first units of data based on address information of the second unit of data, and generate the list information including information on the plurality of first units of data.

The streaming data processor may further include: a splitter configured to split image data and meta data from the second unit of data based on the list information from the authentication processor; and an image decoding processor configured to decode the image data split by the splitter using the decoder.

The streaming data processor may further include: a data parser configured to parse the meta data using address information of the meta data split by the splitter; and a sequencer configured to output the image data decoded by the image decoding processor and the meta data parsed by the parser together.

Effects of the Disclosure

The signal processing device and the image display apparatus including the same according to an embodiment of the present disclosure include a streaming data processor configured to receive streaming data, generate list information including information on a plurality of first units of data based on the received streaming data, and output the generated list information; and a decoder configured to receive the list information and decode the plurality of first units of data based on the list information, wherein the streaming data processor is configured to output data decoded by the decoder. Accordingly, it is possible to reduce the number of inter process communications (IPC) during signal processing of the streaming data. In particular, it is possible to significantly reduce the number of IPCs when outputting list information, compared to a case in which the first units of data is output to the decoder. Accordingly, it is possible to reduce screen interruption when displaying an image based on the streaming data.

Meanwhile, the decoder may decode the plurality of first units of data related to the streaming data based on the information on the first units of data in the list information. Accordingly, the decoder may perform decoding, while reducing the number of IPCs with the streaming data processor.

Meanwhile, the signal processing device may further include: a memory configured to store the streaming data, wherein the decoder may be configured to split the streaming data from the memory into the first units of data based on the number information and address information of the first units of data in the list information and decode the plurality of first units of data based on the split first units of data. Accordingly, it is possible to reduce the number of IPCs during signal processing of the streaming data.

The signal processing device may further include: a memory configured to store the first units of data related to the streaming data, wherein the decoder may be configured to access the first units of data corresponding to the memory based on the number information and address information of the first units of data in the list information and decode the plurality of first units of data based on the accessed first units of data. Accordingly, it is possible to reduce the number of IPCs during signal processing of the streaming data.

The information on the plurality of first units of data may include number information, address information, and length information of the first units of data. Accordingly, the decoder may perform decoding using the information on the plurality of first units of data.

The information on the plurality of first units of data may further include maximum number information and type information of the first units of data. Accordingly, the decoder may perform decoding using the information on the plurality of first units of data.

The streaming data processor may extract the plurality of first units of data by parsing a second unit of data greater than the first unit, and generate the list information including the information on the plurality of first units of data. Accordingly, it is possible to reduce the number of IPCs during signal processing of the streaming data.

The streaming data processor may convert the first units of data into parameter information and transmit update information of the list information and the parameter information to the decoder. Accordingly, it is possible to reduce the number of IPCs during signal processing of the streaming data.

The streaming data processor may be configured to update at least a portion of the list information with parameter information and transmit the updated parameter information, as the list information, to the decoder. Accordingly, it is possible to reduce the number of IPCs during signal processing of the streaming data.

The streaming data processor may include an authentication processor configured to receive address information of a second unit of data greater than the first unit, extract the plurality of first units of data based on address information of the second unit of data, and generate the list information including information on the plurality of first units of data. Accordingly, it is possible to reduce the number of IPCs during signal processing of the streaming data.

The authentication processor may perform authentication on the streaming data and output the list information after performing the authentication. Accordingly, by performing an authentication processing on the streaming data, it is possible to display an image based on the authenticated streaming data.

The streaming data processor may further include a splitter configured to split image data and meta data from the second unit of data based on the list information from the authentication processor; and an image decoding processor configured to decode the image data split by the splitter using the decoder. Accordingly, it is possible to perform decoding of the streaming data, while reducing the number of IPCs during signal processing.

The streaming data processor may further include: a data parser configured to parse the meta data using address information of the meta data split by the splitter; and a sequencer configured to output the image data decoded by the image decoding processor and the meta data parsed by the parser together. Accordingly, it is possible to output the decoded image data and the meta data parsed by the parser together, while reducing the number of IPCs during signal processing.

The streaming data processor may further include: a demultiplexer configured to demultiplex the input streaming data and output the demultiplexed second unit of data; a plug-in processor configured to perform plug-in processing on the second unit of data from the demultiplexer; and a parser configured to receive address information of the second unit of data from the plug-in processor and perform parsing on the second unit of data based on the address information of the second unit of data. Accordingly, it is possible to perform signal processing on the input streaming data.

The number of communications between the streaming data processor and the decoder may be inversely proportional to the number of first units of data in the list information. Accordingly, it is possible to reduce the number of IPCs during signal processing of the streaming data.

Communication between the streaming data processor and the decoder may be performed once per image frame of the streaming data. Accordingly, it is possible to reduce the number of IPCs during signal processing of the streaming data.

The signal processing device and the image display apparatus including the same according to another embodiment of the present disclosure include a streaming data processor configured to receive streaming data, generate list information including information on a plurality of first units of data based on the received streaming data, and output the generated list information; a memory configured to store the first units of data related to the streamlining data; and a decoder configured to receive the list information and decode the plurality of first units of data based on the list information, wherein the streaming data processor is configured to output data decoded by the decoder. Accordingly, it is possible to reduce the number of IPCs during signal processing of the streaming data.

The streaming data processor may include an authentication processor configured to receive address information of a second unit of data greater than the first unit, extract the plurality of first units of data based on address information of the second unit of data, and generate the list information including information on the plurality of first units of data.

The streaming data processor may further include: a splitter configured to split image data and meta data from the second unit of data based on the list information from the authentication processor; and an image decoding processor configured to decode the image data split by the splitter using the decoder. Accordingly, it is possible to perform decoding of the streaming data, while reducing the number of IPCs during signal processing.

The streaming data processor may further include: a data parser configured to parse the meta data using address information of the meta data split by the splitter; and a sequencer configured to output the image data decoded by the image decoding processor and the meta data parsed by the parser together. Accordingly, it is possible to output the decoded image data and the meta data parsed by the parser together, while reducing the number of IPCs during signal processing.

DETAILED DESCRIPTION OF THE PREFERRED EMBODIMENTS

Hereinafter, the present disclosure will be described in detail with reference to the accompanying drawings.

Regarding constituent elements used in the following description, suffixes “module” and “unit” are given only in consideration of ease in the preparation of the specification, and do not have or serve as different meanings. Accordingly, the suffixes “module” and “unit” may be used interchangeably.

Figure 1:
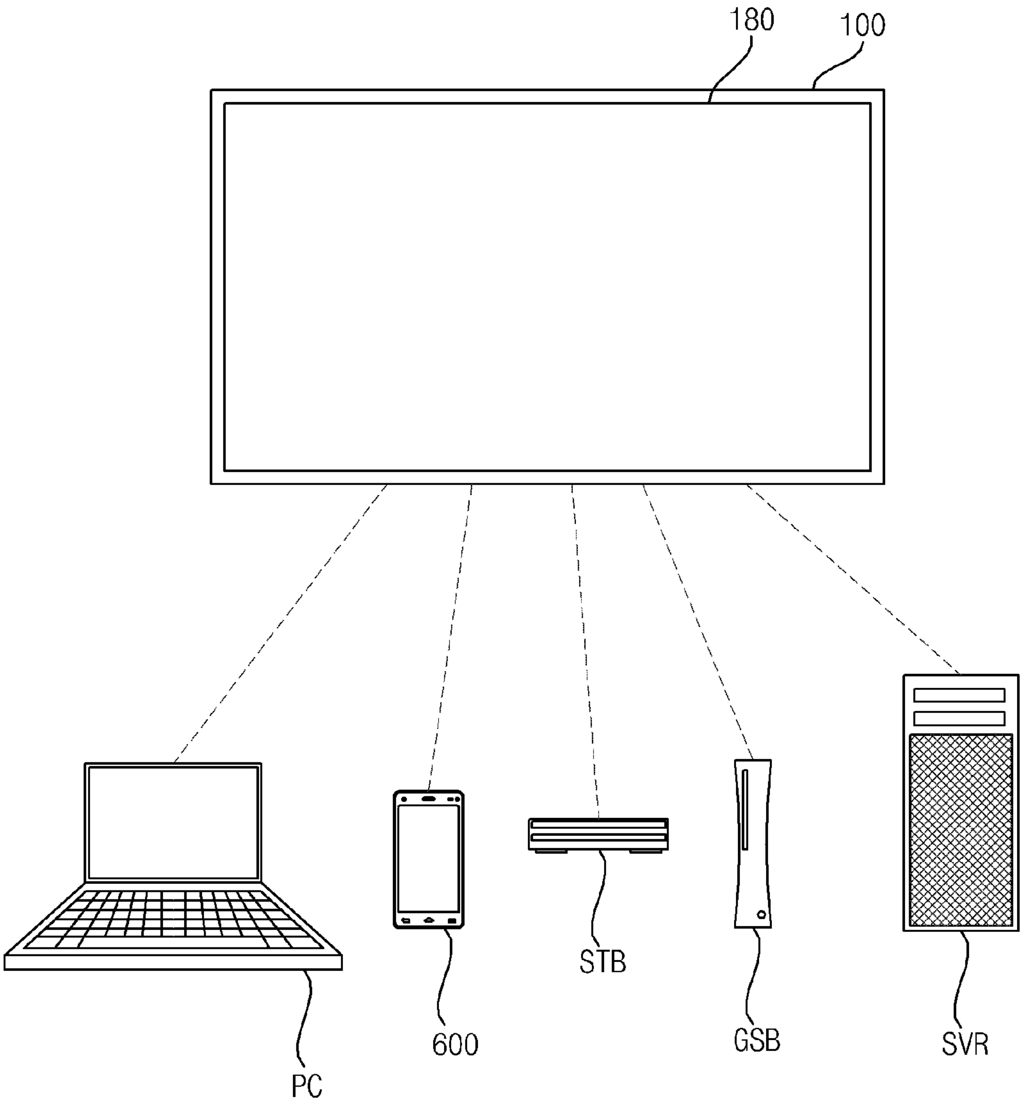
FIG. 1 is a diagram showing an image display apparatus according to an embodiment of the present disclosure.

FIG. 1 is a diagram showing an image display apparatus according to an embodiment of the present disclosure.

Referring to the figure, an image display apparatus 100 may include a display 180.

The image display apparatus 100 may receive image signals from various external devices, process the image signals and display the processed image signals on the display 180.

The various external devices may be, for example, a mobile terminal 600, such as a computer (PC) or a smartphone, a set-top box (STB), a game console (GSB), a server (SVR), and the like.

The display 180 may be implemented as one of various panels. For example, the display 180 may be any one of spontaneous emission panels, such as an organic light emitting diode panel (OLED panel), an inorganic LED panel, and a micro LED panel.

In the present disclosure, an example in which the display 180 includes the organic light emitting diode panel (OLED panel) is mainly described.

Meanwhile, the OLED panel exhibits a faster response speed than the LED and is excellent in color reproduction.

Accordingly, if the display 180 includes an OLED panel, it is preferable that a signal processor 170 (see FIG. 2) of the image display apparatus 100 perform image quality processing for the OLED panel.

Meanwhile, when the image display apparatus 100 receives streaming data from a server SVR or the like, signal processing for the streaming data is required.

For example, when data processing and communication are performed on the streaming data in a predetermined unit, the number of inter process communications (IPC) is increased by the number of predetermined units of data.

Therefore, in the present disclosure, in order to solve this problem, data processing and communication are performed based on list information including information on a predetermined units of data, rather than data processing and communication in a predetermined unit.

That is, the signal processing device 170 and the image display apparatus 100 including the same according to an embodiment of the present disclosure include a streaming data processor 710 receiving streaming data, generate list information 1020 including information on a plurality of first units of data based on the received streaming data, and output the generated list information 1020; and a decoder 325 receiving the list information 1020 and decoding the plurality of first units of data based on the list information 1020, wherein the streaming data processor 710 outputs data decoded by the decoder 325.

Accordingly, it is possible to reduce the number of internal process communications (IPC) during signal processing of the streaming data. In particular, it is possible to significantly reduce the number of IPCs when outputting the list information 1020, compared to a case in which the first units of data is output to the decoder 325. Accordingly, it is possible to reduce screen interruption when displaying an image based on the streaming data.

Meanwhile, the signal processing device 170 and the image display apparatus 100 including the same according to another embodiment of the present disclosure include a streaming data processor 710 receiving streaming data, generate list information 1020 including information on a plurality of first units of data based on the received streaming data, and output the generated list information 1020; a memory 540 storing the first units of data related to the streamlining data; and a decoder 325 receiving the list information 1020 and decoding the plurality of first units of data based on the list information, wherein the streaming data processor 710 outputs data decoded by the decoder 325. Accordingly, it is possible to reduce the number of IPCs during signal processing of the streaming data.

Meanwhile, the image display apparatus 100 of FIG. 1 may be a TV receiver, a monitor, a tablet, a mobile terminal, a vehicle display device, or the like.

Figure 2:
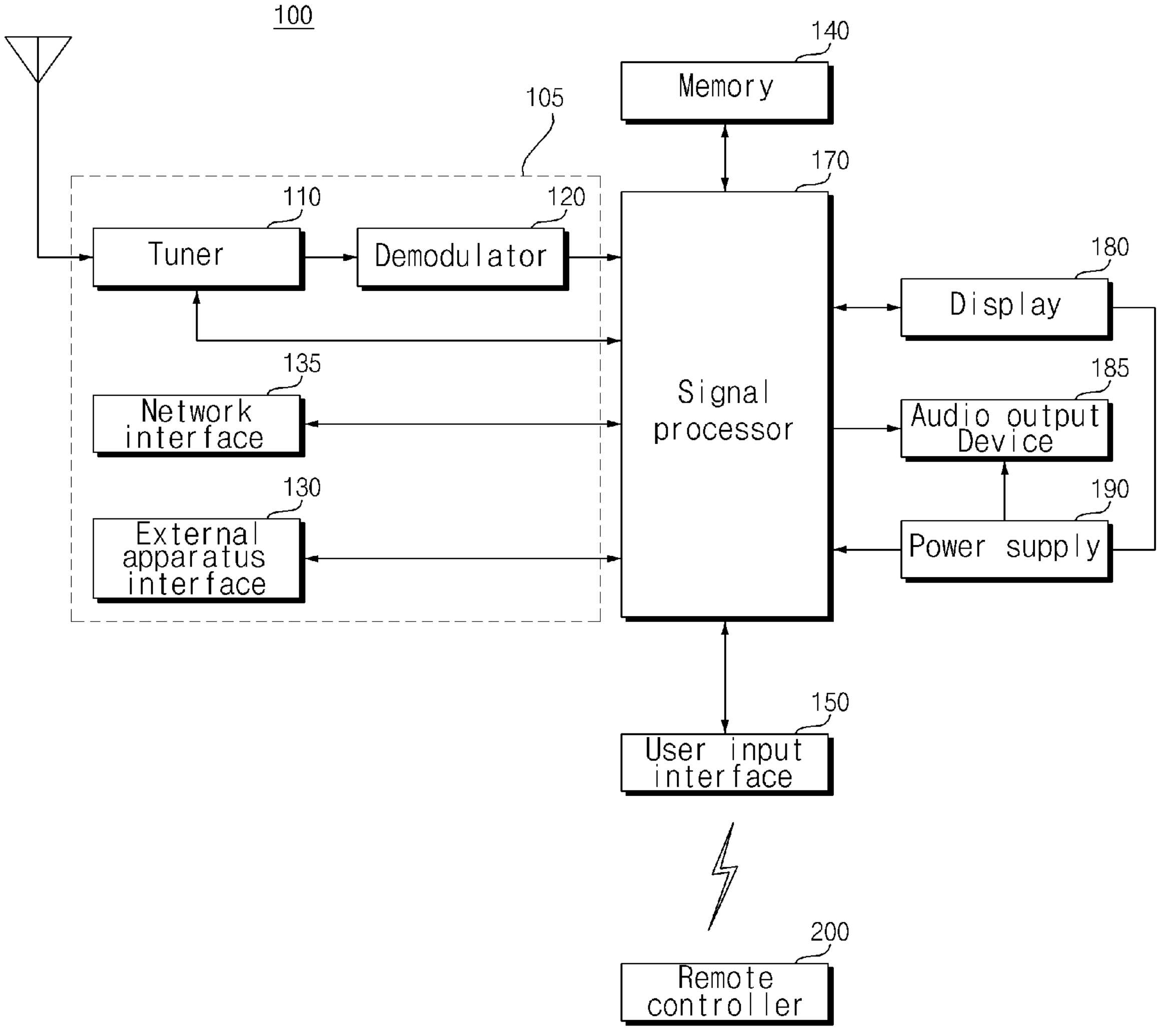
FIG. 2 is an example of an internal block diagram of the image display apparatus.

FIG. 2 is an example of an internal block diagram of the image display apparatus of FIG. 1.

Referring to FIG. 2, the image display apparatus 100 according to an embodiment of the present disclosure includes an image receiver 105, an external apparatus interface 130, a memory 140, a user input interface 150, a sensor unit (not shown), a signal processor 170, a display 180, and an audio output unit 185.

The image receiver 105 may include a tuner 110, a demodulator 120, a network interface 135, and an external apparatus interface 130.

Meanwhile, unlike the figure, the image receiver 105 may include only the tuner 110, the demodulator 120, and the external apparatus interface 130. That is, the network interface 135 may not be included.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

Meanwhile, the tuner 110 may include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the signal processor 170. The signal processor 170 performs demultiplexing, image/audio signal processing, and the like, and then outputs an image to the display 180 and outputs audio to the audio output unit 185.

The external apparatus interface 130 may transmit or receive data with a connected external apparatus (not shown), e.g., a set-top box STB. To this end, the external apparatus interface 130 may include an A/V input and output unit (not shown).

The external apparatus interface 130 may be connected in wired or wirelessly to an external apparatus, such as a digital versatile disk (DVD), a Blu ray, a game equipment, a camera, a camcorder, a computer (note book), and a set-top box, and may perform an input/output operation with an external apparatus.

The A/V input and output unit may receive image and audio signals from an external apparatus. Meanwhile, a wireless communication unit (not shown) may perform short-range wireless communication with other electronic apparatus.

Through the wireless communication unit (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless communication unit (not shown).

The memory 140 may store a program for each signal processing and control in the signal processor 170, and may store signal-processed image, audio, or data signal.

In addition, the memory 140 may serve to temporarily store image, audio, or data signal input to the external apparatus interface 130. In addition, the memory 140 may store information on a certain broadcast channel through a channel memory function, such as a channel map.

Although FIG. 2 illustrates that the memory is provided separately from the signal processor 170, the scope of the present disclosure is not limited thereto. The memory 140 may be included in the signal processor 170.

The user input interface 150 transmits a signal input by the user to the signal processor 170 or transmits a signal from the signal processor 170 to the user.

For example, it may transmit/receive a user input signal, such as power on/off, channel selection, screen setting, etc., from a remote controller 200, may transfer a user input signal input from a local key (not shown), such as a power key, a channel key, a volume key, a set value, etc., to the signal processor 170, may transfer a user input signal input from a sensor unit (not shown) that senses a user's gesture to the signal processor 170, or may transmit a signal from the signal processor 170 to the sensor unit (not shown).

The signal processor 170 may demultiplex the input stream through the tuner 110, the demodulator 120, the network interface 135, or the external apparatus interface 130, or process the demultiplexed signals to generate and output a signal for image or audio output.

For example, the signal processor 170 receives a broadcast signal received by the image receiver 105 or an HDMI signal, and perform signal processing based on the received broadcast signal or the HDMI signal to thereby output a processed image signal.

The image signal processed by the signal processor 170 is input to the display 180, and may be displayed as an image corresponding to the image signal. In addition, the image signal processed by the signal processor 170 may be input to the external output apparatus through the external apparatus interface 130.

The audio signal processed by the signal processor 170 may be output to the audio output unit 185 as an audio signal. In addition, audio signal processed by the signal processor 170 may be input to the external output apparatus through the external apparatus interface 130.

Although not shown in FIG. 2, the signal processor 170 may include a demultiplexer, an image processor, and the like. That is, the signal processor 170 may perform a variety of signal processing and thus it may be implemented in the form of a system on chip (SOC). This will be described later with reference to FIG. 3.

In addition, the signal processor 170 may control the overall operation of the image display apparatus 100. For example, the signal processor 170 may control the tuner 110 to control the tuning of the RF broadcast corresponding to the channel selected by the user or the previously stored channel.

In addition, the signal processor 170 may control the image display apparatus 100 according to a user command input through the user input interface 150 or an internal program.

Meanwhile, the signal processor 170 may control the display 180 to display an image. At this time, the image displayed on the display 180 may be a still image or a moving image, and may be a 2D image or a 3D image.

Meanwhile, the signal processor 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processor 170 may recognize the position of the user based on the image photographed by a photographing unit (not shown). For example, the distance (z-axis coordinate) between a user and the image display apparatus 100 may be determined. In addition, the x-axis coordinate and the y-axis coordinate in the display 180 corresponding to a user position may be determined.

The display 180 generates a driving signal by converting an image signal, a data signal, an OSD signal, a control signal processed by the signal processor 170, an image signal, a data signal, a control signal, and the like received from the external apparatus interface 130.

Meanwhile, the display 180 may be configured as a touch screen and used as an input device in addition to an output device.

The audio output unit 185 receives a signal processed by the signal processor 170 and outputs it as an audio.

The photographing unit (not shown) photographs a user. The photographing unit (not shown) may be implemented by a single camera, but the present disclosure is not limited thereto and may be implemented by a plurality of cameras. Image information photographed by the photographing unit (not shown) may be input to the signal processor 170.

The signal processor 170 may sense a gesture of the user based on each of the images photographed by the photographing unit (not shown), the signals detected from the sensor unit (not shown), or a combination thereof.

The power supply 190 supplies corresponding power to the image display apparatus 100. Particularly, the power may be supplied to a signal processor 170 which may be implemented in the form of a system on chip (SOC), a display 180 for displaying an image, and an audio output unit 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcast receiver capable of receiving digital broadcast.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be split into two or more components. The function performed in each block is described for the purpose of illustrating embodiments of the present disclosure, and specific operation and apparatus do not limit the scope of the present disclosure.

Figure 3:
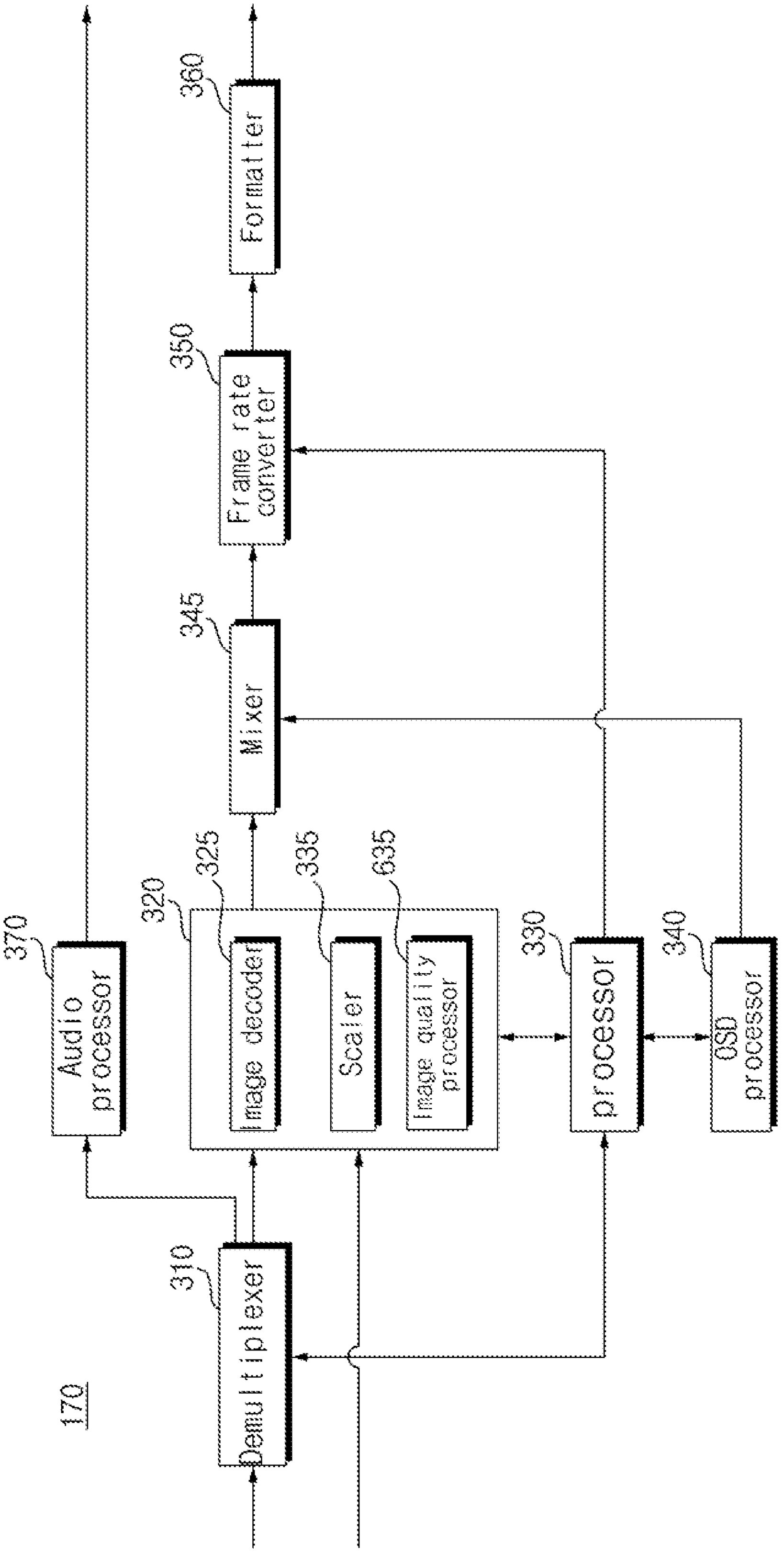
FIG. 3 is an example of an internal block diagram of a signal processor of FIG. 2.

FIG. 3 is an example of an internal block diagram of the signal processor in FIG. 2.

Referring to the figure, the signal processor 170 according to an embodiment of the present disclosure may include a demultiplexer 310, an image processor 320, a processor 330, and an audio processor 370. In addition, the signal processor 170 may further include and a data processor (not shown).

The demultiplexer 310 demultiplexes the input stream. For example, when an MPEG-2 TS is input, it may be demultiplexed into image, audio, and data signal, respectively. Here, the stream signal input to the demultiplexer 310 may be a stream signal output from the tuner 110, the demodulator 120, or the external apparatus interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal may be output from the display 180.

The image decoder 325 may include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 625 may perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially an OLED panel, etc.

The OSD processor 340 generates an OSD signal according to a user input or by itself. For example, based on a user input signal, the OSD processor 340 may generate a signal for displaying various information as a graphic or a text on the screen of the display 180. The generated OSD signal may include various data, such as a user interface screen of the image display apparatus 100, various menu screens, a widget, and an icon. In addition, the generated OSD signal may include a 2D object or a 3D object.

In addition, the OSD processor 340 may generate a pointer that may be displayed on the display, based on a pointing signal input from the remote controller 200. In particular, such a pointer may be generated by a pointing signal processor, and the OSD processor 340 may include such a pointing signal processor (not shown). Obviously, the pointing signal processor (not shown) may be provided separately from the OSD processor 340.

The frame rate converter (FRC) 350 may convert a frame rate of an input image. Meanwhile, the frame rate converter 350 may output the input image without converting the frame rate.

Meanwhile, the formatter 360 may change a format of an input image signal into a format suitable for displaying the image signal on a display and output the image signal in the changed format.

In particular, the formatter 360 may change a format of an image signal to correspond to a display panel.

The processor 330 may control overall operations of the image display apparatus 100 or the signal processor 170.

For example, the processor 330 may control the tuner 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external apparatus interface 130.

In addition, the processor 330 may control the demultiplexer 310, the image processor 320, and the like in the signal processor 170.

Meanwhile, the audio processor 370 in the signal processor 170 may perform the audio processing of the demultiplexed audio signal. To this end, the audio processor 370 may include various decoders.

In addition, the audio processor 370 in the signal processor 170 may process a base, a treble, a volume control, and the like.

The data processor (not shown) in the signal processor 170 may perform data processing of the demultiplexed data signal. For example, when the demultiplexed data signal is a coded data signal, it may be decoded. The encoded data signal may be electronic program guide information including broadcast information, such as a start time and an end time of a broadcast program broadcasted on each channel.

Meanwhile, a block diagram of the signal processor 170 shown in FIG. 3 is a block diagram for an embodiment of the present disclosure. Each component of the block diagram may be integrated, added, or omitted according to a specification of the signal processor 170 actually implemented.

In particular, the frame rate converter 350 and the formatter 360 may be provided separately in addition to the image processor 320.

Figure 4A:
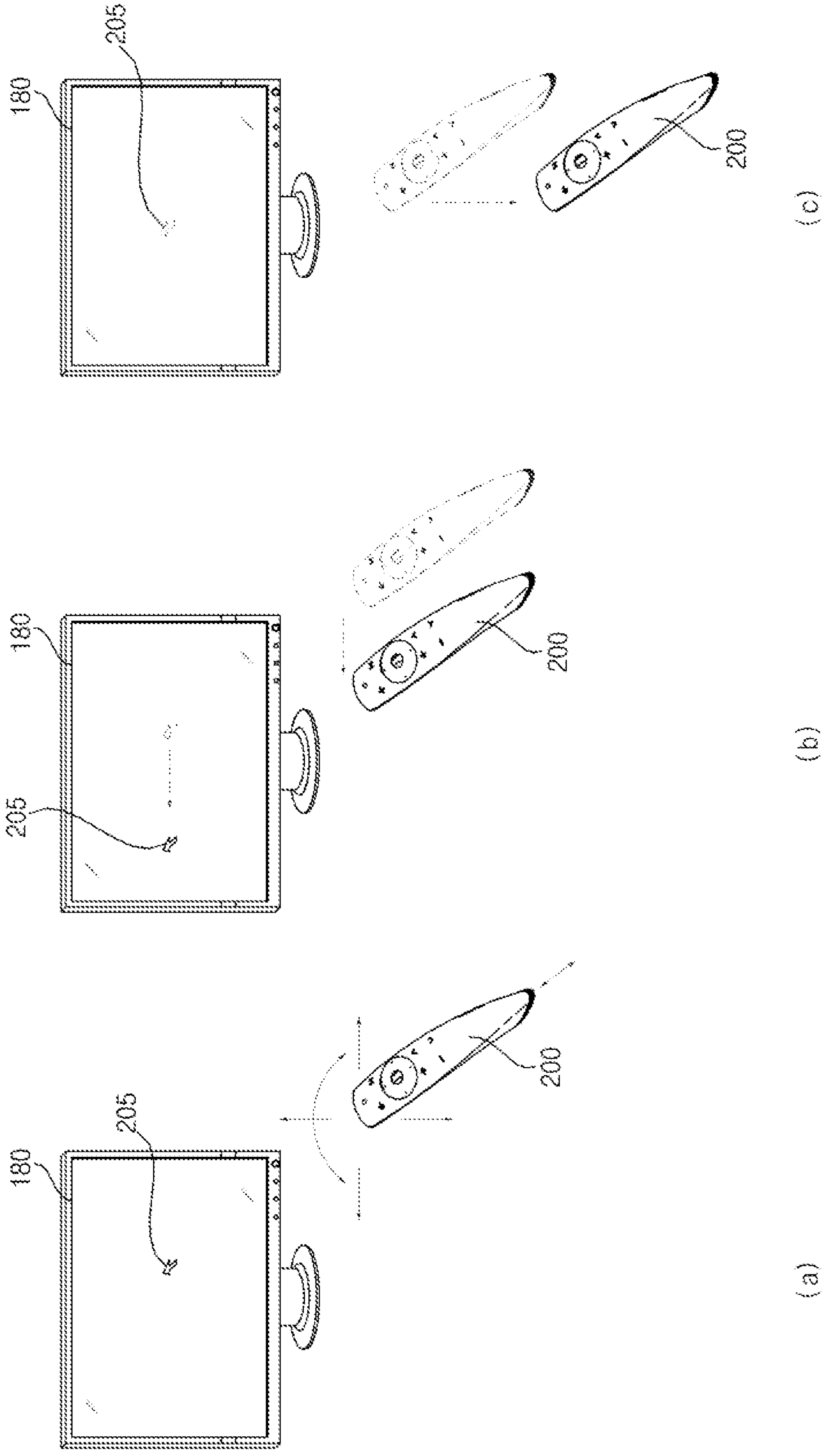
FIG. 4A is a diagram showing a method of controlling a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the figure.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180, while pressing a specific button of the remote controller 200. Thus, a selection area within the display 180 corresponding to the pointer 205 may be zoomed in so that it may be displayed to be enlarged. Meanwhile, when the user moves the remote controller 200 close to the display 180, the selection area within the display 180 corresponding to the pointer 205 may be zoomed out so that it may be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
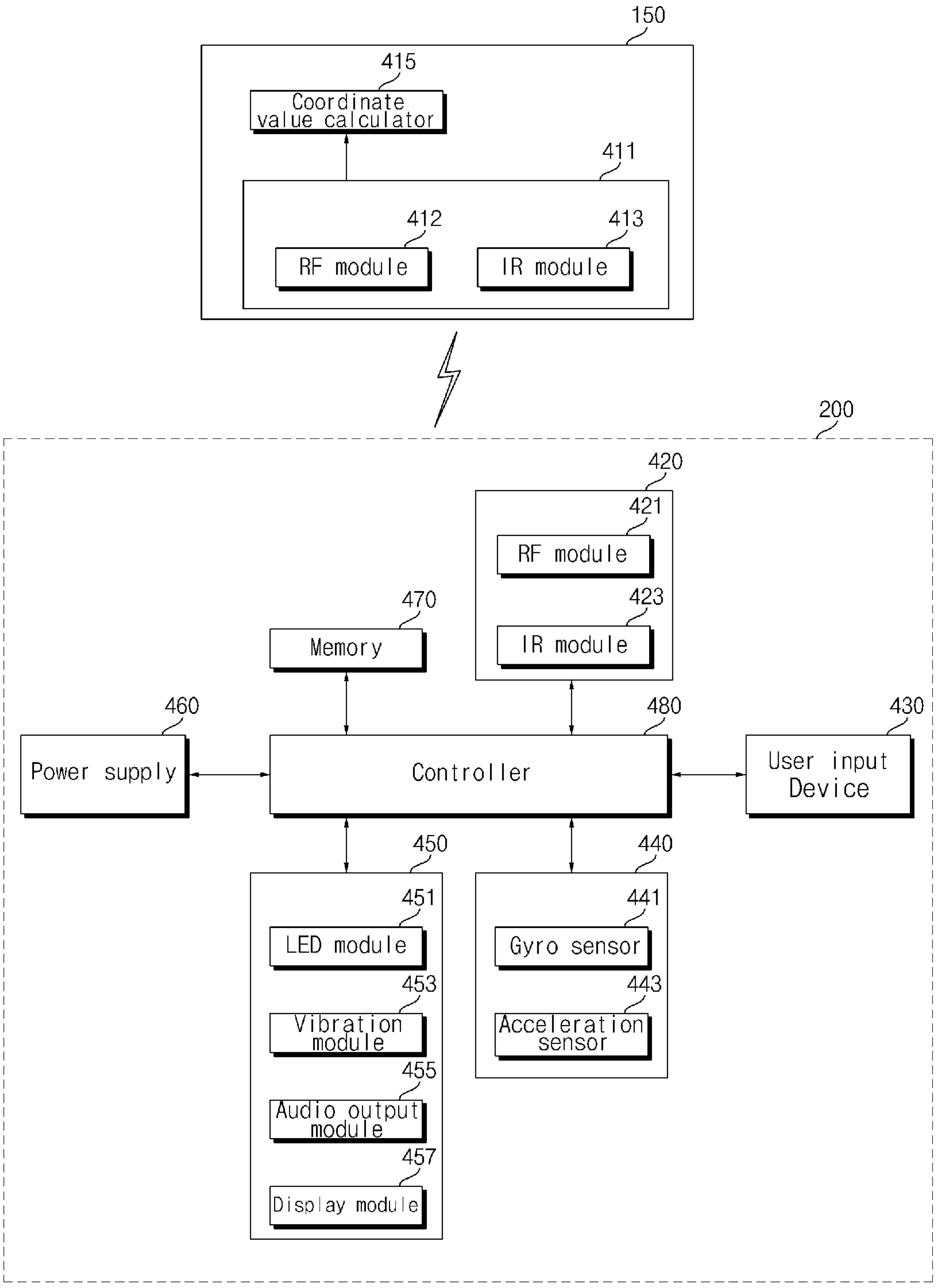
FIG. 4B is an internal block diagram of the remote controller of FIG. 2.

FIG. 4B is an internal block diagram of the remote controller of FIG. 2.

Referring to the figure, the remote controller 200 includes a wireless communication unit 425, a user input unit 435, a sensor unit 440, an output unit 450, a power supply 460, a memory 470, and a controller 480.

The wireless communication unit 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input unit 435 may be implemented by a keypad, a button, a touch pad, a touch screen, or the like. The user may operate the user input unit 435 to input a command related to the image display apparatus 100 to the remote controller 200. When the user input unit 435 includes a hard key button, the user may input a command related to the image display apparatus 100 to the remote controller 200 through a push operation of the hard key button. When the user input unit 435 includes a touch screen, the user may touch a soft key of the touch screen to input the command related to the image display apparatus 100 to the remote controller 200. In addition, the user input unit 435 may include various types of input means, such as a scroll key, a jog key, etc., which may be operated by the user, and the present disclosure does not limit the scope of the present disclosure.

The sensor unit 440 may include a gyro sensor 441 or an acceleration sensor 443. The gyro sensor 441 may sense information regarding the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output unit 450 may output an image or an audio signal corresponding to the operation of the user input unit 435 or a signal transmitted from the image display apparatus 100. Through the output unit 450, the user may recognize whether the user input unit 435 is operated or whether the image display apparatus 100 is controlled.

For example, the output unit 450 may include an LED module 451 that is turned on when the user input unit 435 is operated or a signal is transmitted/received to/from the image display apparatus 100 through the wireless communication unit 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information regarding a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input unit 435 or a signal corresponding to the motion of the remote controller 200 sensed by the sensor unit 440 to the image display apparatus 100 through the wireless communication unit 425.

The user input interface 150 of the image display apparatus 100 includes a wireless communication unit 151 that may wirelessly transmit and receive a signal to and from the remote controller 200 and a coordinate value calculator 415 that may calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless communication unit 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the figure, the coordinate value calculator 415 may be provided in the signal processor 170, not in the user input interface 150.

Figure 5:
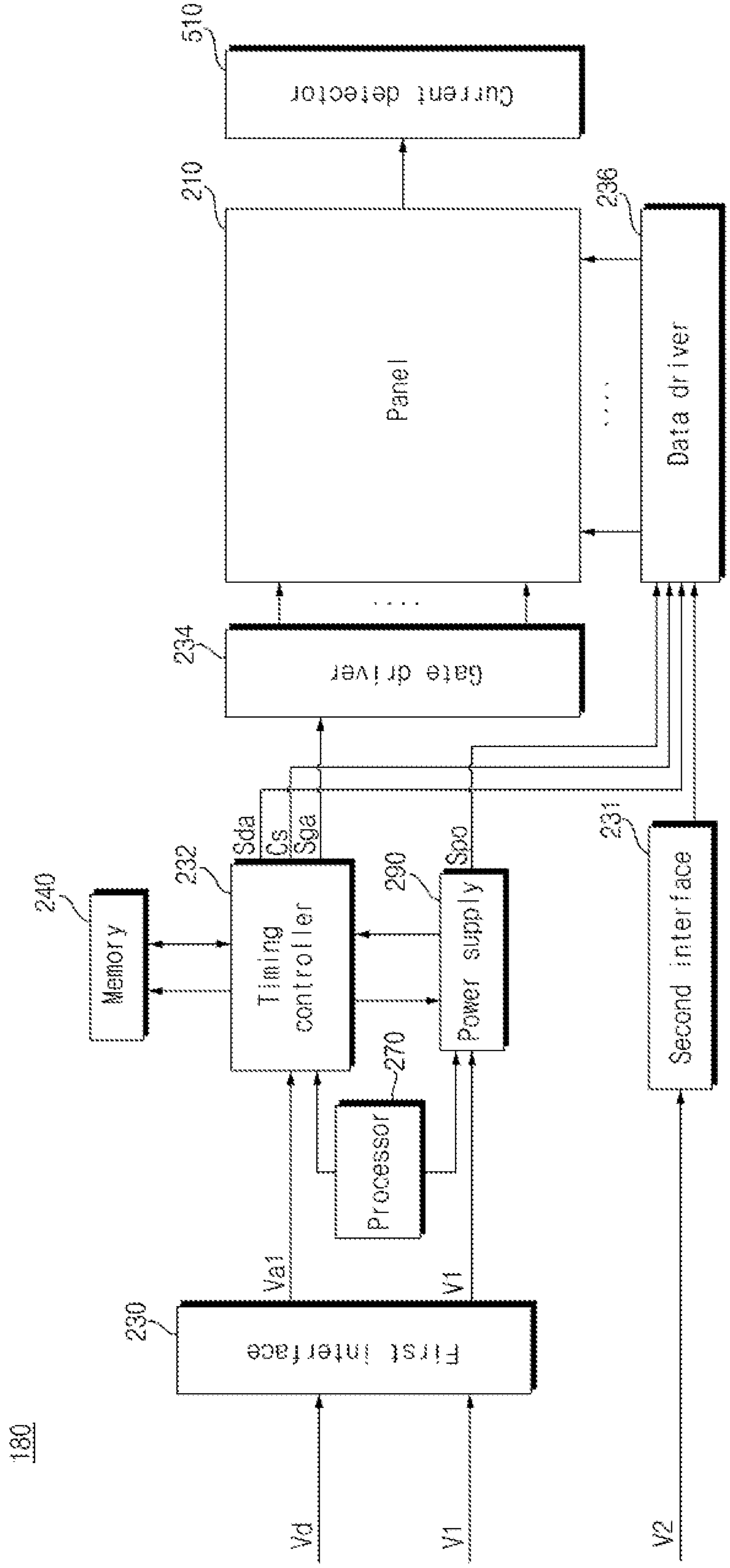
FIG. 5 is an internal block diagram of a display of FIG. 2.

FIG. 5 is an internal block diagram of a display of FIG. 2.

Referring to FIG. 5, the organic light emitting diode panel-based display 180 may include an organic light emitting diode panel 210, a first interface 230, a second interface 231, a timing controller 232, a gate driver 234, a data driver 236, a memory 240, a processor 270, a power supply 290, a current detector 510, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the signal processor 170.

Here, the first DC power V1 may be used for the operation of the power supply 290 and the timing controller 232 in the display 180.

Next, the second interface 231 may receive a second DC power V2 from an external power supply 190.

Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal val, the timing controller 232 may output the data driving signal Sda and the gate driving signal Sga based on the converted image signal val.

The timing controller 232 may further receive a control signal, a vertical synchronization signal Vsync, and the like, in addition to the image signal Vd from the signal processor 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

At this time, when the panel 210 includes a RGBW subpixel, the data driving signal Sda may be a data driving signal for driving of RGBW subpixel.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 510 may detect the current flowing in a sub-pixel of the organic light emitting diode panel 210. The detected current may be input to the processor 270 or the like, for a cumulative current calculation.

The processor 270 may perform each type of control of the display 180. For example, the processor 270 may control the gate driver 234, the data driver 236, the timing controller 232, and the like.

Meanwhile, the processor 270 may receive current information flowing in a sub-pixel of the organic light emitting diode panel 210 from the current detector 510.

In addition, the processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or higher than 300000 A, the processor 270 may determine that a corresponding subpixel is a burn-in subpixel.

Meanwhile, if the accumulated current of each subpixel of the OLED panel 210 is close to an allowable value, the processor 270 may determine that a corresponding subpixel is a subpixel expected to be burn in.

Meanwhile, based on a current detected by the current detector 510, the processor 270 may determine that a sub-pixel having the greatest accumulated current is an expected burn-in subpixel.

Figure 6A:
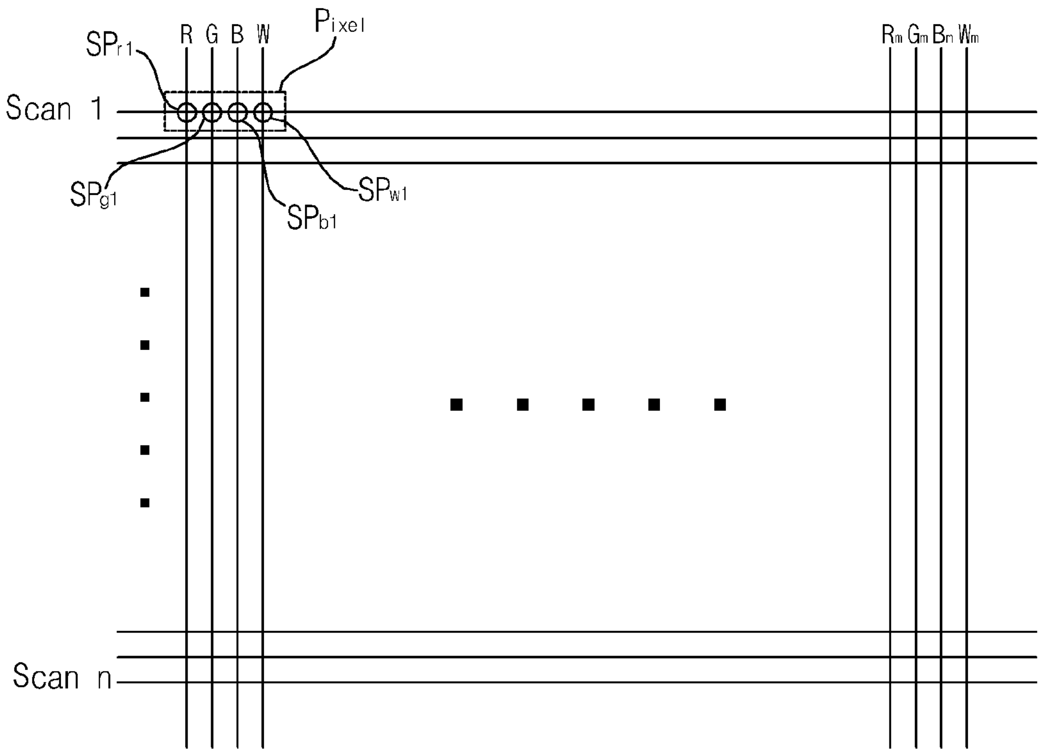
FIGS. 6A and 6B are diagrams referred to in the description of an organic light emitting diode panel of FIG. 5.
Figure 6B:
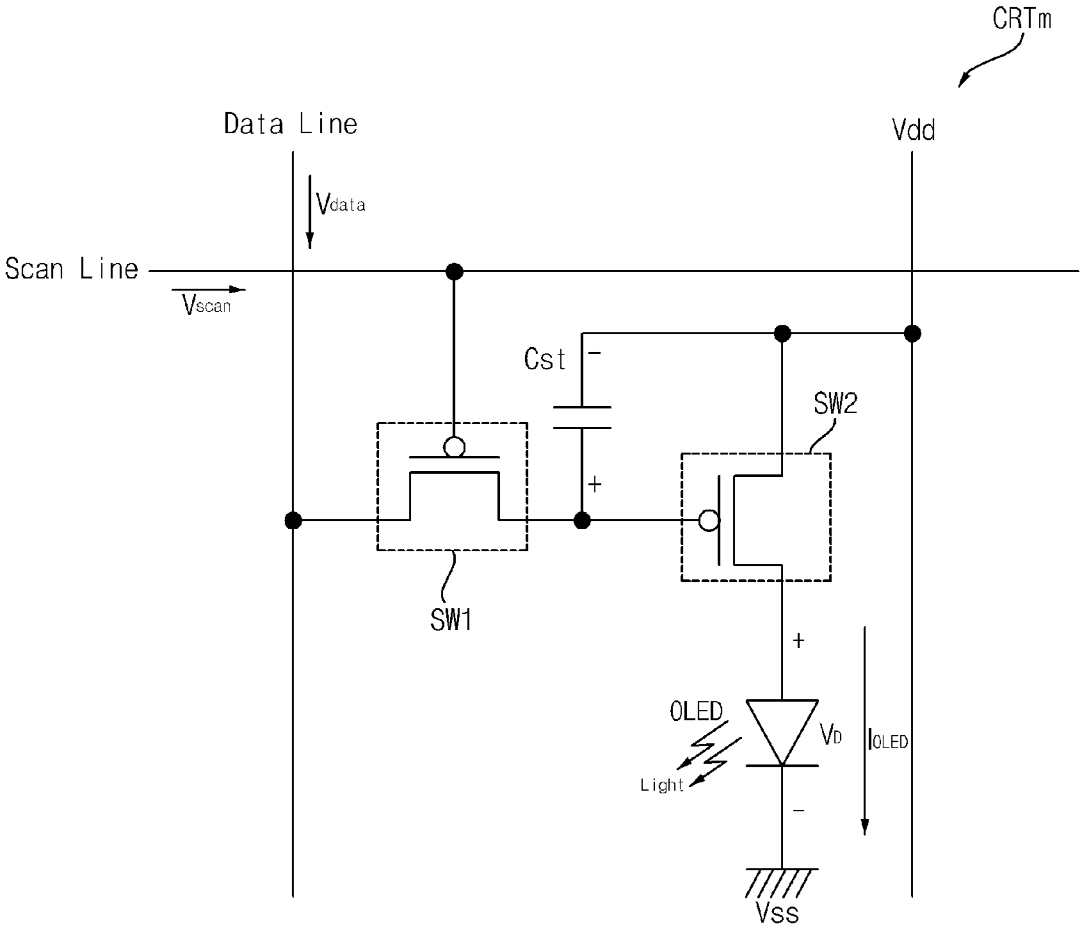

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to the figure, the organic light emitting diode panel 210 may include a plurality of scan lines Scan1 to Scann and a plurality of data lines R1, G1, B1, W1 to Rm, Gm, Bm, Wm intersecting the scan lines.

Meanwhile, a pixel (subpixel) is defined in an intersecting area of the scan line and the data line in the organic light emitting diode panel 210. In the figure, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to the figure, an organic light emitting sub pixel circuit (CRTm) may include, as an active type, a scan switching element SW1, a storage capacitor Cst, a drive switching element SW2, and an organic light emitting layer (OLED).

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a pulse width modulation (PWM) method, the power level stored in the storage capacitor Cst varies according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the figure, it is illustrated that a p-type MOSFET is used for a scan switching element SW1 and a drive switching element SW2, but an n-type MOSFET or other switching element, such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Meanwhile, with the development of cameras and broadcasting technology, the resolution and vertical synchronization frequency of an input image signal have increased. In particular, the need for signal processing for image signals having 4K resolution and 120 Hz vertical resolution has been raised. In particular, the need for signal processing of high-resolution streaming data has been raised.

Figure 7A:
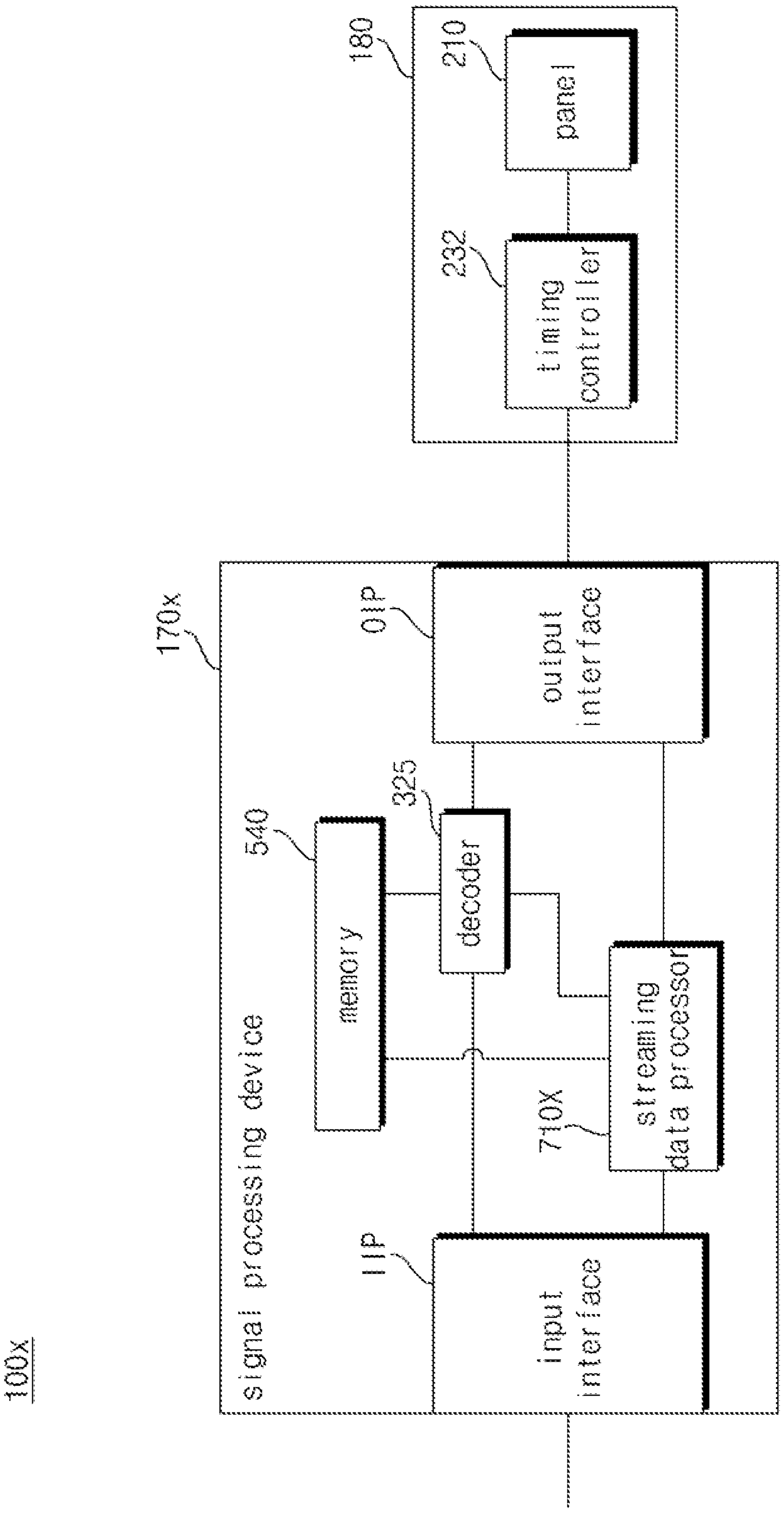
FIG. 7A is a block diagram of an image display apparatus according to the present disclosure.
Figure 7B:
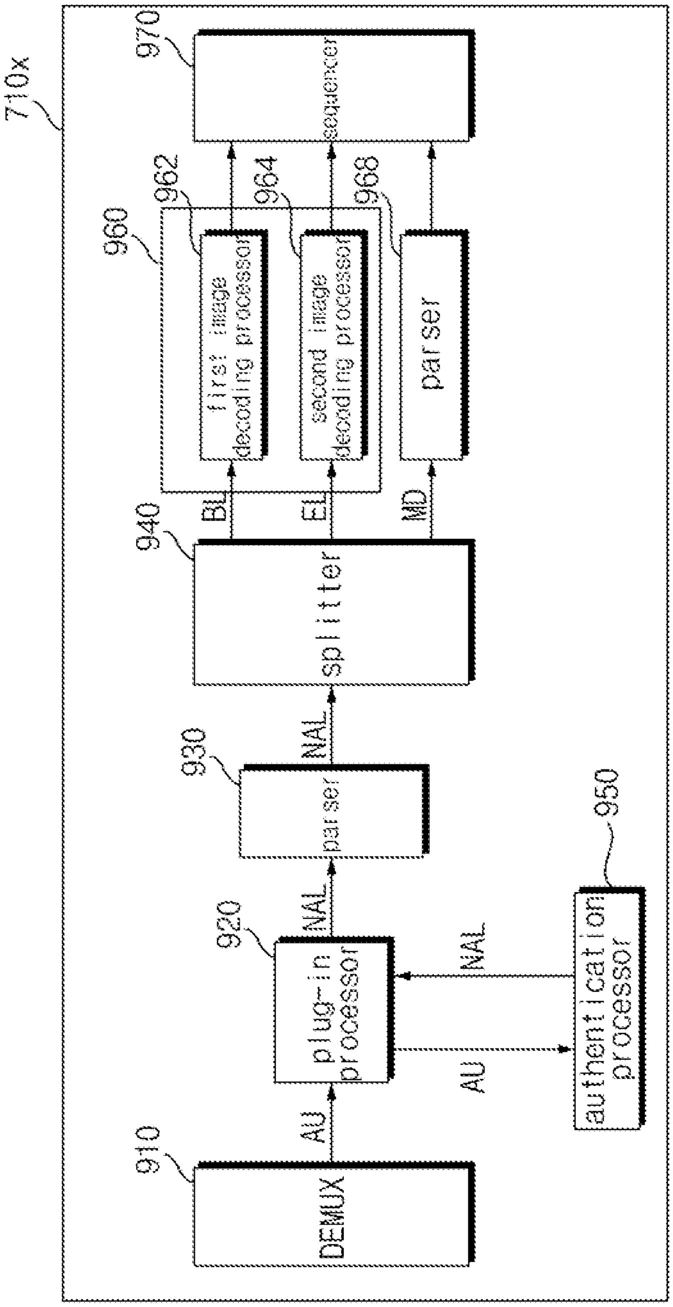
FIGS. 7B to 7C are diagrams referenced for describing an operation of the image display apparatus of FIG. 7A.
Figure 7C:
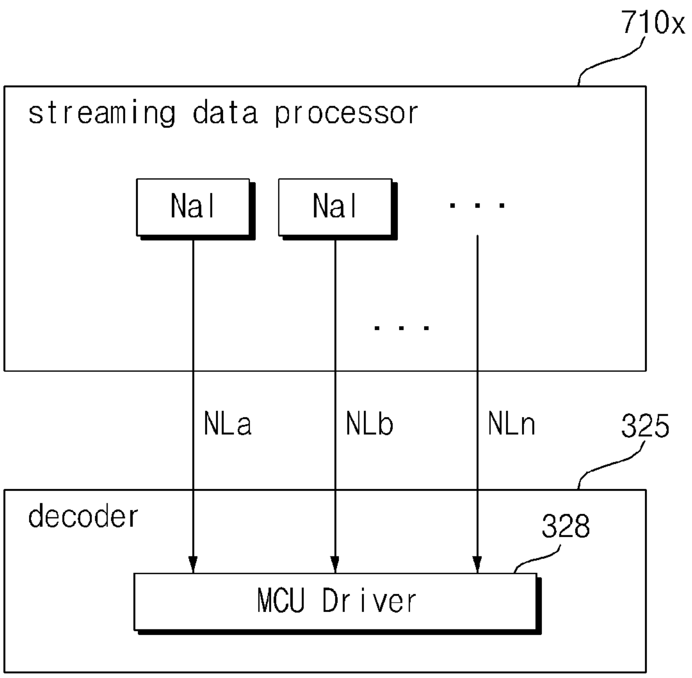

FIG. 7A is a block diagram of an image display apparatus related to the present disclosure, and FIGS. 7B to 7C are diagrams referenced for describing the operation of the image display apparatus of FIG. 7A.

First, referring to FIG. 7A, an image display apparatus 100*x* related to the present disclosure may include a signal processing device 170*x* and a display 180.

The display 180 may include a timing controller 9232 that receives an image data signal output from the signal processing device 170*x* and processes the signal and a panel 210 that displays an image.

The signal processing device 170*x* includes an input interface (IIP) receiving a signal from the outside, a streaming data processor 710*x* processing data when the signal from the outside is streaming data, a memory 540, a decoder 325 performing image decoding, and an output interface (OIP) outputting the decoded image signal to the outside.

FIG. 7B is an example of an internal block diagram of the streaming data processor 710*x* of FIG. 7A.

Referring to the figure, the streaming data processor 710*x* may include a demultiplexer 910 demultiplexing input streaming data and outputting a demultiplexed second unit of data, a plug-in processor 920 performing plug-in processing on the second unit of data from the demultiplexer 91, outputting the second unit of data to the outside, and receiving streaming data of a first unit smaller than the second unit, an authentication processor converting the second unit of data from the plug-in processor 920 into the first unit of streaming data and outputting the same, a parser 930 receiving address information of the second unit of data from the plug-in processor 920 and performing parsing on the second unit of data based on the address information of the second unit of data, a splitter 940 splitting a plurality of first units of streaming data from the image parser 930, a decoding processor 960 processing the first unit of data split by the splitter 940 to be decoded, a data parser 968 parsing meta data of the first unit of data split by the splitter 940, and a sequencer 970 outputting data decoded by the decoding processor 960 and the meta data parsed by the parser 968 together.

The decoding processor 960 may include a first image decoding processor 962 and a second image decoding processor 964 for image decoding.

In this case, the first image decoding processor 962, the second image decoding processor 964, and the data parser 968 may each process the first units of data.

For example, the first image decoding processor 962 may transmit a plurality of first units of image data to the decoder 325 and may receive a plurality of first units of image data decoded by the decoder 325.

FIG. 7C illustrates transmission of address information NLa, NLb, . . . , NLn of a plurality of first units of image data from the streaming data processor 710*x* to the driver 328 in the decoder 325.

Referring to the figure, as the number of pieces of address information NLa, NLb, . . . , NLn of a plurality of first units of image data increases, IPC between the streaming data processor 710*x* and the decoder 325 increases. Accordingly, waste of resources due to the increase in IPC may occur, and system performance may be degraded.

Therefore, in the present disclosure, a method of transmitting list information including information related to first units of data between the streaming data processor and the decoder, instead of transmitting address information of a plurality of first units of data, is proposed. This will be described with reference to FIG. 8 below.

Figure 8:
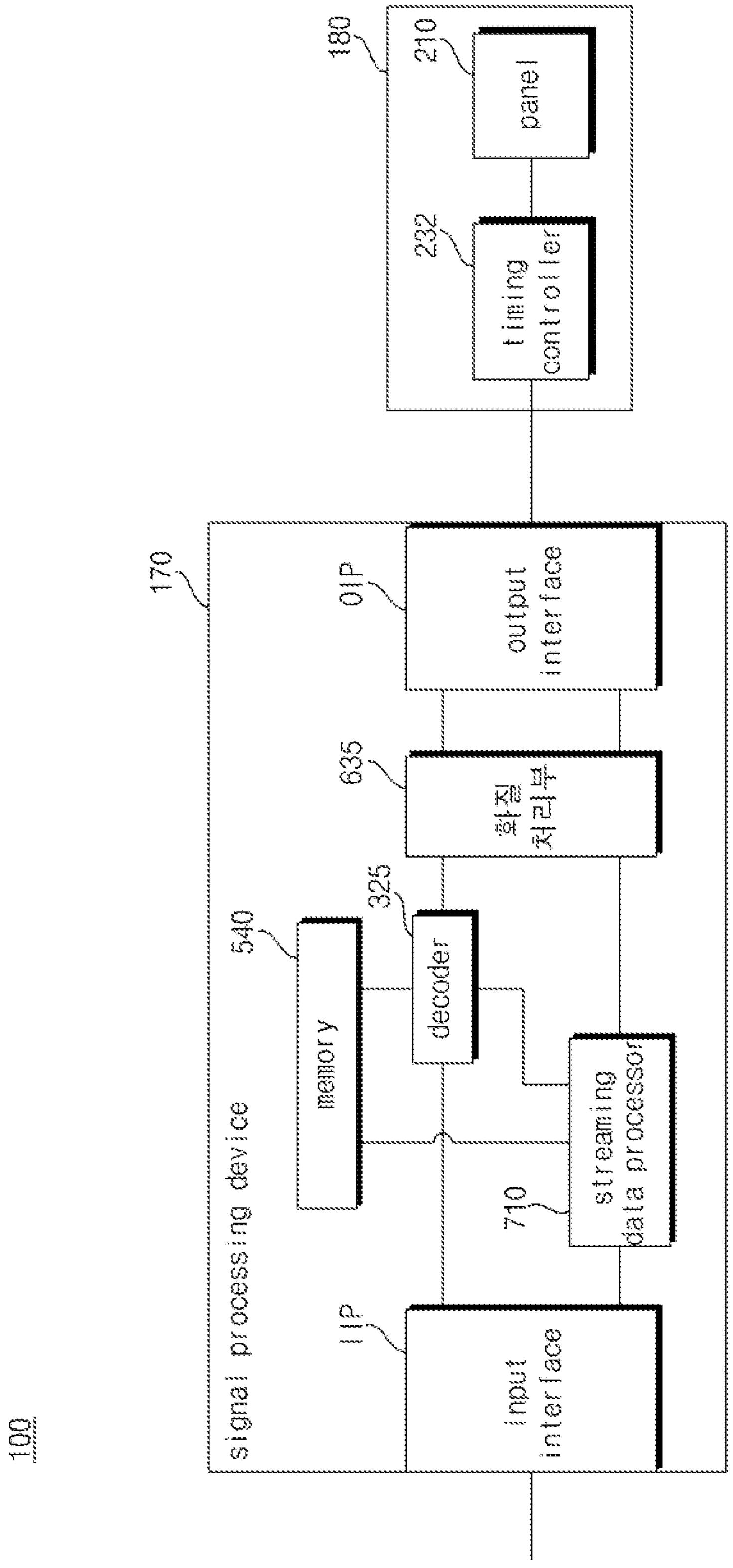
FIG. 8 is a block diagram of an image display apparatus according to an embodiment of the present disclosure.

FIG. 8 is a block diagram of an image display apparatus according to an embodiment of the present disclosure, and FIGS. 9 to 14 are reference views illustrating an operation of the image display apparatus of FIG. 8.

First, referring to FIG. 8, an image display apparatus 100 according to an embodiment of the present disclosure includes a signal processing device 170 and a display 180.

Meanwhile, the display 180 includes a timing controller 232 and a panel 210, and the timing controller 232 receives an image from the signal processing device 170, processes the received image, and supplies the processed image to the panel 210.

The signal processing device 170 according to an embodiment of the present disclosure includes a streamlining data processor 710 receiving streaming data, generate list information 1020 including information on a plurality of first units of data and based on the received streaming data, and output the generated list information 1020 and a decoder 325 receiving the list information 1020 and decoding the plurality of first units of data based on the list information 1020, and the streaming data processor 710 outputs data decoded by the decoder 325.

Accordingly, it is possible to reduce the number of internal process communications (IPC) during signal processing of the streaming data. In particular, it is possible to significantly reduce the number of IPCs when outputting the list information 1020, compared to a case in which the first units of data is output to the decoder 325. Accordingly, it is possible to reduce screen interruption when displaying an image based on the streaming data.

Meanwhile, the streaming data processor 710 may include Gstreamer (GST). For example, Gstreamer (GST) may be a framework that provides an environment for creating a streaming multimedia application, such as a media player or video editor.

Meanwhile, the signal processing device 170 according to an embodiment of the present disclosure may further include an input interface (IIP) receiving a signal from the outside and an output interface (OIP) outputting a decoded image signal to the outside.

For example, when the signal from the outside through the input interface (IIP) is streaming data, the streaming data processor 710 may generate list information 1020 including information on the plurality of first units of data based on the received streaming data and output the generated list information 1020.

Meanwhile, the decoder 325 may decode the plurality of first units of data related to the streaming data based on information on the first units of data in the list information 1020. Accordingly, the decoder 325 may perform decoding, while reducing the number of IPCs with the streaming data processor 710.

Meanwhile, the signal processing device 170 according to an embodiment of the present disclosure may further include a memory 540 for storing streaming data.

Meanwhile, the memory 540 may store a plurality of first units of data or a plurality of second units of data.

The streaming data processor 710 may read the first units of data from the memory 540 or store the first units of data into the memory 540 using the address information of the first units of data.

Meanwhile, the streaming data processor 710 may read the second unit of data from the memory 540 or store the second unit of data into the memory 540 using the address information of the second unit of data.

The decoder 325 may split the streaming data from the memory 540 into first units of data based on number information of the first units of data in the list information 1020 and the address information of the first units of data, and decode the plurality of first units of data based on the split first units of data. Accordingly, it is possible to reduce the number of IPCs during signal processing of the streaming data.

Meanwhile, the memory 540 may store first units of data related to streaming data.

Accordingly, the decoder 325 may access the first units of data corresponding to the memory 540 based on the number information of the first units of data in the list information 1020 and the address information of the first units of data, and decode the plurality of first units of data based on the accessed first units of data. Accordingly, it is possible to reduce the number of IPCs during signal processing of the streaming data.

Meanwhile, the information on the plurality of first units of data may include number information, address information, and length information of the first units of data. Accordingly, the decoder 325 may perform decoding using the information on the plurality of first units of data.

Meanwhile, the information on the plurality of first units of data may further include maximum number information and type information of the first units of data. Accordingly, the decoder 325 may perform decoding using the information on the plurality of first units of data.

Meanwhile, the streaming data processor 710 may extract the plurality of first units of data by parsing data of a second unit greater than the first unit, and generate the list information 1020 including the information on the plurality of first units of data. Accordingly, it is possible to reduce the number of IPCs during signal processing of the streaming data.

Meanwhile, the streaming data processor 710 may convert the first units of data into parameter information and transmit update information of the list information 1020 and parameter information to the decoder 325. Accordingly, it is possible to reduce the number of IPCs during signal processing of the streaming data.

Meanwhile, the streaming data processor 710 may update at least a portion of the list information 1020 to parameter information and transmit the updated parameter information to the decoder 325. Accordingly, it is possible to reduce the number of IPCs during signal processing of the streaming data.

Figure 9:
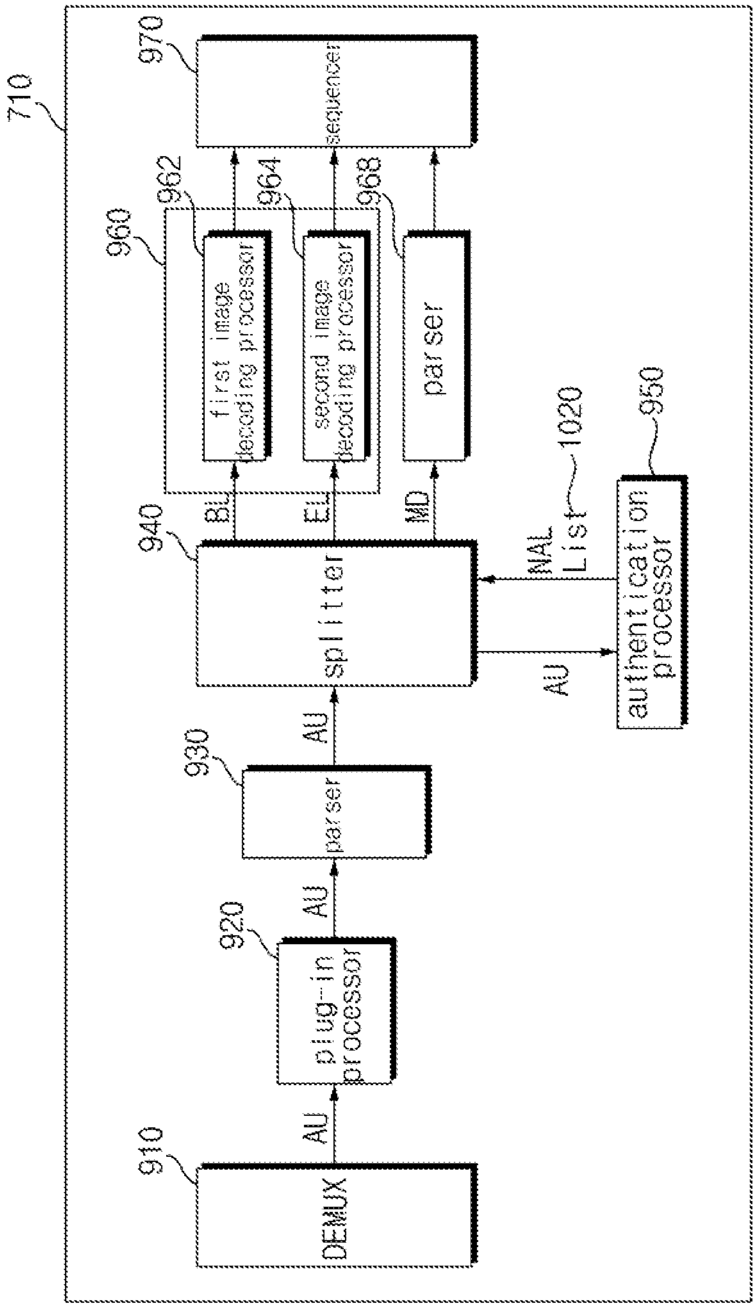
FIGS. 9 to 14 are diagrams referenced for describing an operation of the image display apparatus of FIG. 8.

FIG. 9 is an example of an internal block diagram of the streaming data processor 710.

Referring to the figure, the streaming data processor 710 may include an authentication processor 950 receiving address information of data of the second unit greater than the first unit, extract a plurality of first units of data using address information of the second unit of data, and generate list information 1020 including information on a plurality of first units of data. Accordingly, it is possible to reduce the number of IPCs during signal processing of the streaming data.

Meanwhile, the authentication processor 950 may perform authentication on the streaming data, and output the list information 1020 after authentication is performed. Accordingly, by performing the authentication process on the streaming data, it is possible to display an image based on the authenticated streaming data.

Meanwhile, the authentication processor 950 may process the streaming data, e.g., streaming image data, and in particular, may process the data after completion of authentication.

For example, the authentication processor 950 may complete authentication for the streaming data using an authentication key stored therein, and may process the data after authentication is completed. The processing the data may include generating the list information 1020 with the second unit of data.

Meanwhile, the streaming data processor 710 may further include: a splitter 940 splitting image data and meta data from the second unit of data based on the list information 1020 from the authentication processor 950 and a first image decoding processor 962 decoding the image data BL split by the splitter 940 using the decoder 325.

Meanwhile, the first image decoding processor 962 may decode the image data BL split by the splitter 940 based on the list information 1020. Accordingly, it is possible to perform decoding on the streaming data, while reducing the number of IPCs during signal processing.

Meanwhile, the streaming data processor 710 may further include a second image decoding processor 964 decoding the image data EL split by the splitter 940 using the decoder 325.

Meanwhile, the second image decoding processor 964 may decode the image data EL split by the splitter 940 based on the list information 1020. Accordingly, it is possible to perform decoding on the streaming data, while reducing the number of IPCs during signal processing.

Meanwhile, the streaming data processor 710 may further include a data parser 968 parsing the meta data MD split by the splitter 940.

Meanwhile, the streaming data processor 710 may further include a sequencer 970 outputting image data decoded from the image decoding processor 962 and meta data parsed by the parser 930 together. Accordingly, while reducing the number of IPCs during signal processing, the decoded image data and the meta data parsed by the parser 930 may be output together.

Meanwhile, the data parser 968 may parse the meta data MD split by the splitter 940 based on the list information 1020. Accordingly, it is possible to perform signal processing on the meta data, while reducing the number of IPCs during signal processing.

Meanwhile, referring to the figure, the decoding processor 960 may include a first image decoding processor 962 and a second image decoding processor 964 performing signal-processing on the data BL, EL and MD split by the splitter 940 based on the list information 1020. Accordingly, it is possible to perform signal processing, while reducing the number of IPCs during signal processing.

Meanwhile, the streaming data processor 710 may further include a demultiplexer 910 demultiplexing the input streaming data and outputting the demultiplexed second unit of data, a plug-in processor 920 performing plug-in processing on the second unit of data from the demultiplexer 910, and a parser 930 receiving address information of the second unit of data from the plug-in processor 920 and performing parsing on the second unit of data based on the address information of the second unit of data. Accordingly, it is possible to perform signal processing on the input streaming data.

Meanwhile, the plug-in processor 920 may include elements constituting a framework, and may perform plug-in processing using these elements.

Meanwhile, the number of communications between the streaming data processor 710 and the decoder 325 may be inversely proportional to the number of first units of data in the list information 1020 or address information of the first units of data. Accordingly, it is possible to reduce the number of IPCs during signal processing of the streaming data.

Meanwhile, communication between the streaming data processor 710 and the decoder 325 may be performed once per image frame of the streaming data. Accordingly, it is possible to reduce the number of IPCs during signal processing of the streaming data.

Meanwhile, the signal processing device 170 according to an embodiment of the present disclosure may further include an image quality processor 635 for image quality processing of an image signal output from the decoder 325 or the streaming data processor 710. This will be described with reference to FIG. 10 below.

Meanwhile, the signal processing device 170 and the image display apparatus 100 including the same according to another embodiment of the present disclosure include a streaming data processing unit 710 receiving streaming data, generate list information 1020 including information on a plurality of first units of data based on the received streaming data, and output the generated list information 1020; a memory 540 storing the first units of data related to the streamlining data; and a decoder 325 receiving the list information 1020 and decoding the plurality of first units of data based on the list information, wherein the streaming data processing unit 710 outputs data decoded by the decoder 325. Accordingly, it is possible to reduce the number of IPCs during signal processing of the streaming data.

Figure 10:
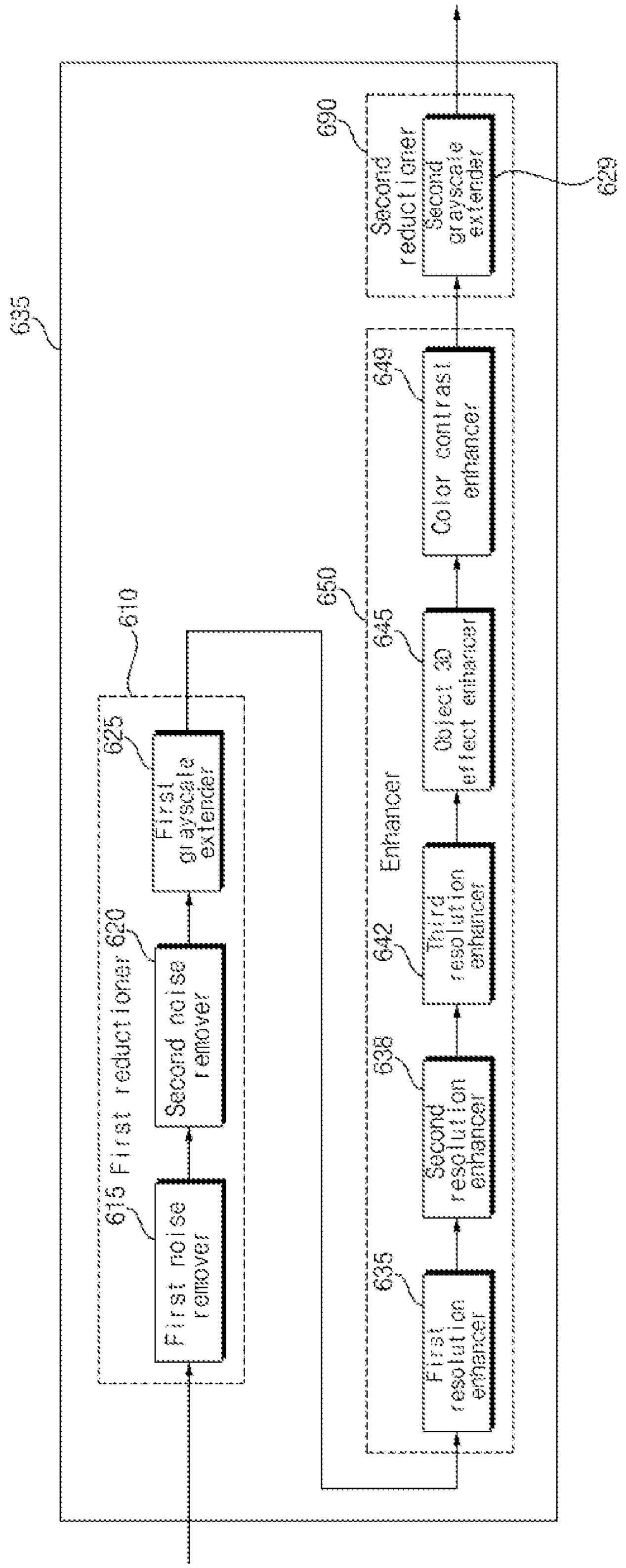

FIG. 10 is an example of an internal block diagram of the image quality processor of FIG. 9.

Referring to the figure, the image quality processor 635 may include a first reductioner 610, an enhancer 650, and a second reductioner 690.

The first reductioner 610 may perform noise removal on the image signal processed by the decoder 325 or the streaming data processor 710.

For example, the first reductioner 610 may perform multi-stage noise removal process and a first-stage grayscale extension processing on the image processed by the decoder 325 or the streaming data processor 710.

As another example, the first reductioner 610 may perform the multi-stage noise removal processing and the first-stage grayscale extension processing on an HDR image from the decoder 325 or the streaming data processor 710.

To this end, the first reductioner 610 may include a plurality of noise removers 615 and 620 for removing noise in multiple stages, and a grayscale extender 625 for grayscale extension.

The enhancer 650 may perform multistage bit resolution enhancement processing on an image from the first reductioner 610.

Further, the enhancer 650 may perform object 3D effect enhancement processing. In addition, the enhancer 650 may perform color or contrast enhancement processing.

To this end, the enhancer 650 may include a plurality of resolution enhancers 635, 638 and 642 for enhancing resolution in multiple stages, an object 3D effect enhancer 645 for enhancing the 3D effect of an object, and a color contrast enhancer 649 for enhancing colors or contrast.

Next, the second reductioner 690 may perform second-stage grayscale extension processing based on a noise-removed image signal input from the first reductioner 610.

Meanwhile, the second reductioner 690 may amplify an upper limit level of the gray level of the input signal and extend the resolution of the gray level of the input signal. Accordingly, it is possible to reduce the number of IPCs during signal processing of the streaming data.

For example, grayscale extension may be uniformly performed on the entire grayscale region of an input signal.

Accordingly, uniform grayscale extension may be performed on an input image to enhance high grayscale expression.

Meanwhile, the second reductioner 690 may include a second grayscale extender 629 performing grayscale amplification and extension based on an input signal from the first grayscale extender 625. Accordingly, it is possible to reduce the number of IPCs during signal processing of the streaming data.

Meanwhile, the second reductioner 690 may vary a degree of amplification based on a user input signal when the input image signal is an SDR image signal. Accordingly, high grayscale expression may be enhanced in response to user settings.

Meanwhile, when the input image signal is an HDR video signal, the second reductioner 690 may perform amplification according to a set value. Accordingly, it is possible to reduce the number of IPCs during signal processing of the streaming data.

Meanwhile, the second reductioner 690 may vary a degree of amplification based on a user input signal when the input image signal is an HDR image signal. Accordingly, high grayscale expression may be enhanced in response to user settings.

Further, the second reductioner 690 may vary a degree of amplification based on a user input signal when the input image signal is an HDR image signal. Accordingly, high grayscale expression may be enhanced in response to user settings.

Meanwhile, the second reductioner 690 may amplify an upper limit level of the grayscale according to a grayscale conversion mode. Accordingly, it is possible to reduce the number of IPCs during signal processing of the streaming data.

Meanwhile, the image quality processor 635 in the signal processing device 170 of the present disclosure may perform 4-stage reduction processing and 4-stage image enhancement processing, as shown in the figure.

Here, four-stage reduction processing may include two-stage noise removal and two-stage grayscale extension.

Two-stage noise removal may be performed by the first and second noise removers 615 and 620 in the first reductioner 610, and two-stage grayscale extension may be performed by the first grayscale extender 625 in the first reductioner 610 and the second grayscale extender 629 in the second reductioner 690.

Meanwhile, four-stage image enhancement processing may include three-stage bit resolution enhancement and object 3D effect enhancement.

Here, three-stage bit resolution enhancement may be processed by the first to third resolution enhancers 635, 638 and 642 and object 3D effect enhancement may be processed by the object 3D effect enhancer 645.

Figure 11:
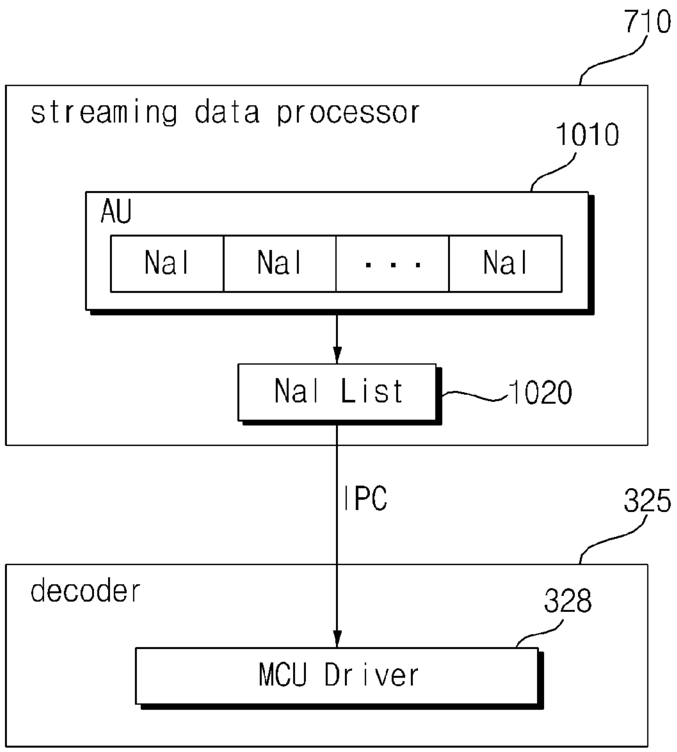

FIG. 11 is a diagram illustrating transmission of the list information 1020 from the streaming data processor 710 to the decoder 325.

Referring to the figure, the streaming data processor 710 may transmit list information 1020 to the decoder 325 for image decoding.

To this end, the authentication processor 950 in the streaming data processor 710 may receive address information of data of a second unit greater than the first unit, extract a plurality of first units of data using address information of the second unit of data, and generate the list information 1020 including information on the plurality of first data units.

The first unit in FIG. 11 may be a network abstraction layer (Nal) unit, and the second unit may be an access unit or access unit delimiter (AU) unit.

That is, the second unit of data may include a plurality of first units of data.

Further, the authentication processor 950 in the streaming data processor 710 may generate list information 1020 based on a plurality of first units of data or address information of a plurality of first units of data.

Meanwhile, the list information 1020 may include information on the plurality of first units of data.

For example, the list information 1020 may include information on the number of the plurality of first units of data and address information in the memory 540.

Meanwhile, the list information 1020 may further include length information of the plurality of first units of data.

Meanwhile, the list information 1020 may further include information on the maximum number of the plurality of first units of data and type information of the plurality of first units of data.

Meanwhile, the MCU driver 328 in the decoder 325 may receive the list information 1020, access the first units of data corresponding to the memory 540 based on the number information of the first units of data in the list information and the address information, and decode the plurality of first units of data based on the accessed first units of data. Accordingly, it is possible to reduce the number of IPCs during signal processing of the streaming data.

In particular, when the streaming data processor 710*x* of FIG. 7C outputs the first units of data to the decoder 325, IPC should be performed as many as the number of first units of data between the streaming data processor 710*x* and the decoder 325, but since the streaming data processor 710 of FIG. 11 outputs the list information 1020, one time of IPC is performed between the streaming data processor 710 and the decoder 325. Accordingly, it is possible to reduce the number of IPCs during signal processing of the streaming data.

Meanwhile, communication between the streaming data processor 710 and the decoder 325 may be performed once per image frame of the streaming data. Accordingly, it is possible to reduce the number of IPCs during signal processing of the streaming data.

Meanwhile, the number of communications between the streaming data processor 710 and the decoder 325 may be inversely proportional to the number of first units of data in the list information 1020. That is, as the number of first units of data in the list information 1020 increases, the number of communications between the streaming data processor 710 and the decoder 325 may decrease or may be constant. Accordingly, it is possible to reduce the number of IPCs during signal processing of the streaming data.

Meanwhile, the MCU driver 328 in the decoder 325 may receive the list information 1020, split the streaming data from the memory 540 into first units of data based on the number information in the list information 1020 and the address information of the first units of data, and decode the plurality of first units of data based on the split first units of data.

Figure 12:
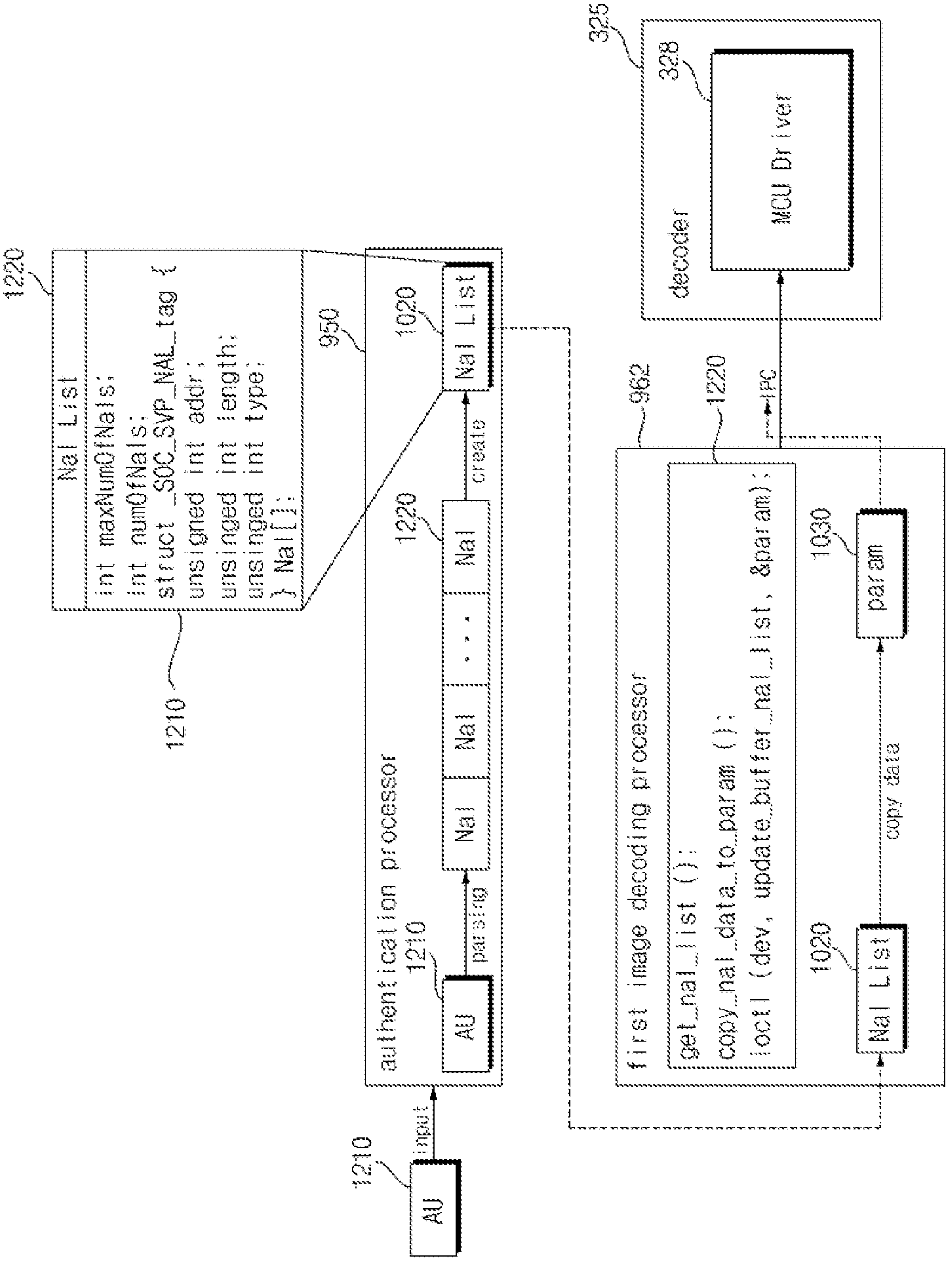

FIG. 12 is a reference diagram for describing operations of the authentication processor 950, the decoding processor 962, and the decoder 325.

Referring to the figure, the authentication processor 950 may receive a second unit of data 1210, parse the second unit of data 1210 to extract a plurality of first units of data 1220, and generate list information 1020 including information

1210 on the plurality of first units of data based on the plurality of first units of data 1220.

As shown in the drawing, the information 1210 on a plurality of first units of data in the list information 1020 may include information on the maximum number of the first units of data (int maxNumOfNals) and information on the number of first unit of data (int NumOfNals), address information (unsigned int addr), length information (unsigned int length), and type information (unsigned int type).

Meanwhile, the first image decoding processor 962 may transmit the plurality of first units of image data or list information 1020 to the decoder 325, and may receive a plurality of first units of image decoded by the decoder 325.

In the figure, the first video decoding processor 962 transmits the list information 1020 to the decoder 325 as an example.

Meanwhile, the first image decoding processor 962 in the streaming data processor 710 may convert the first units of data into parameter information and transmit update information of the list information 1020 and parameter information to the decoder 325. Accordingly, it is possible to reduce the number of IPCs during signal processing of the streaming data.

In the figure, the first video decoding processor 962 may receive the list information 1020 generated by the authentication processor 950, convert the first units of data in the list information 1020 into parameter information, and transmit the update information of the list information 1020 and the parameter information to the decoder 325, as an example.

To this end, the first image decoding processor 962 may perform an execution command 1220 including a list information reception command (get_nal_list), a parameter generation command (copy_nal_data_to_param), and a command to transmit update information and parameter information (ioctl(dev, update_buffer_nal_list,&param).

Accordingly, it is possible to reduce the number of IPCs during signal processing of the streaming data, particularly, during decoding of streaming data.

Meanwhile, the first image decoding processor 962 in the streaming data processor 710 may update at least a portion of the list information 1020 to parameter information and transmit the updated parameter to the decoder 325. Accordingly, it is possible to reduce the number of IPCs during signal processing of the streaming data.

Figure 13:
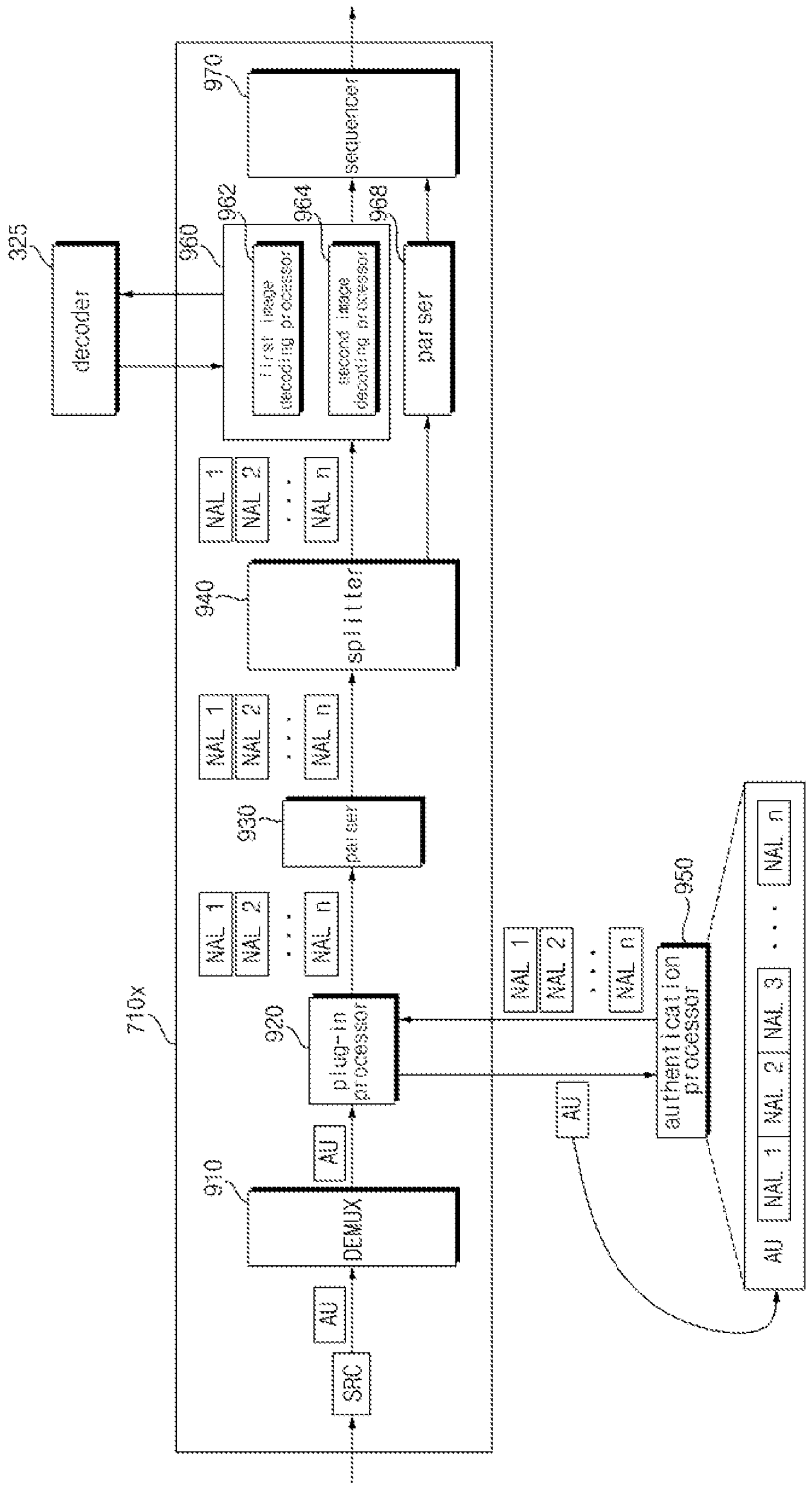

FIG. 13 is a diagram referenced for describing the operation of the streaming data processor 710*x* of FIG. 7B.

Referring to the figure, a streaming data processor 710*x* receives streaming data SRC.

The demultiplexer 910 in the streaming data processor 710*x* demultiplexes the second unit of data. Accordingly, the second unit of image data may be output.

Meanwhile, the plug-in processor 920 in the streaming data processor 710*x* performs plug-in processing on the second unit of data, in particular, the second unit of image data.

Meanwhile, the plug-in processor 920 in the streaming data processor 710*x* transmits the second unit of data to the authentication processor 950, receive a plurality of first units of data smaller than the second unit or address information NAL1 to NALn of the plurality of first units of data, and output the address information NAL1 to NALn of the plurality of first units of data.

Meanwhile, the authentication processor 950 in the streaming data processor 710*x* receives address information of the second unit of data from the plug-in processor 920, performs processing such as authentication and the like using the address information of the second unit of data, and then output address information NAL1 to NALn of the plurality of first units of data.

At this time, the number of address information of the plurality of first units of data is much greater than the number of address information of a plurality of second units of data.

Meanwhile, the image parser 930 in the streaming data processor 710*x* receives the address information NAL1 to NALn of the plurality of first units of data from the plug-in processor 920, and performs parsing on the plurality of first units of data based on the address information NAL1 to NALn of the plurality of first units of data.

Meanwhile, the splitter 940 in the streaming data processor 710*x* receives the address information NAL1 to NALn of the plurality of first units of data from the image parser 930, and split the plurality of first units of data into image data, meta data, etc.

The first image decoding processor 962 and the second image decoding processor 964 in the decoding processor 960 in the streaming data processor 710*x* receive the address information NAL1 to NALn of the plurality of first units of data from the splitter 940, transmit the address information NAL1 to NALn of the plurality of first units of data to the decoder 325, and receive the plurality of first units of decoded image data from the decoder 325, respectively.

At this time, since IPC should be performed as much as the number of address information NAL1 to NALn of the plurality of first units of data between the decoding processor 960 and the decoder 325, the number of IPCs increases. Therefore, waste of resources due to the increase in IPC may occur and system performance may be degraded.

Meanwhile, the data parser 968 in the streaming data processor 710*x* may receive address information of meta data from the splitter 940 and parse the meta data using the received address information of the meta data.

Meanwhile, the sequencer 970 in the streaming data processor 710*x* outputs the data decoded by the decoding processor 960 and the meta data parsed by the data parser 968 together.

Figure 14:
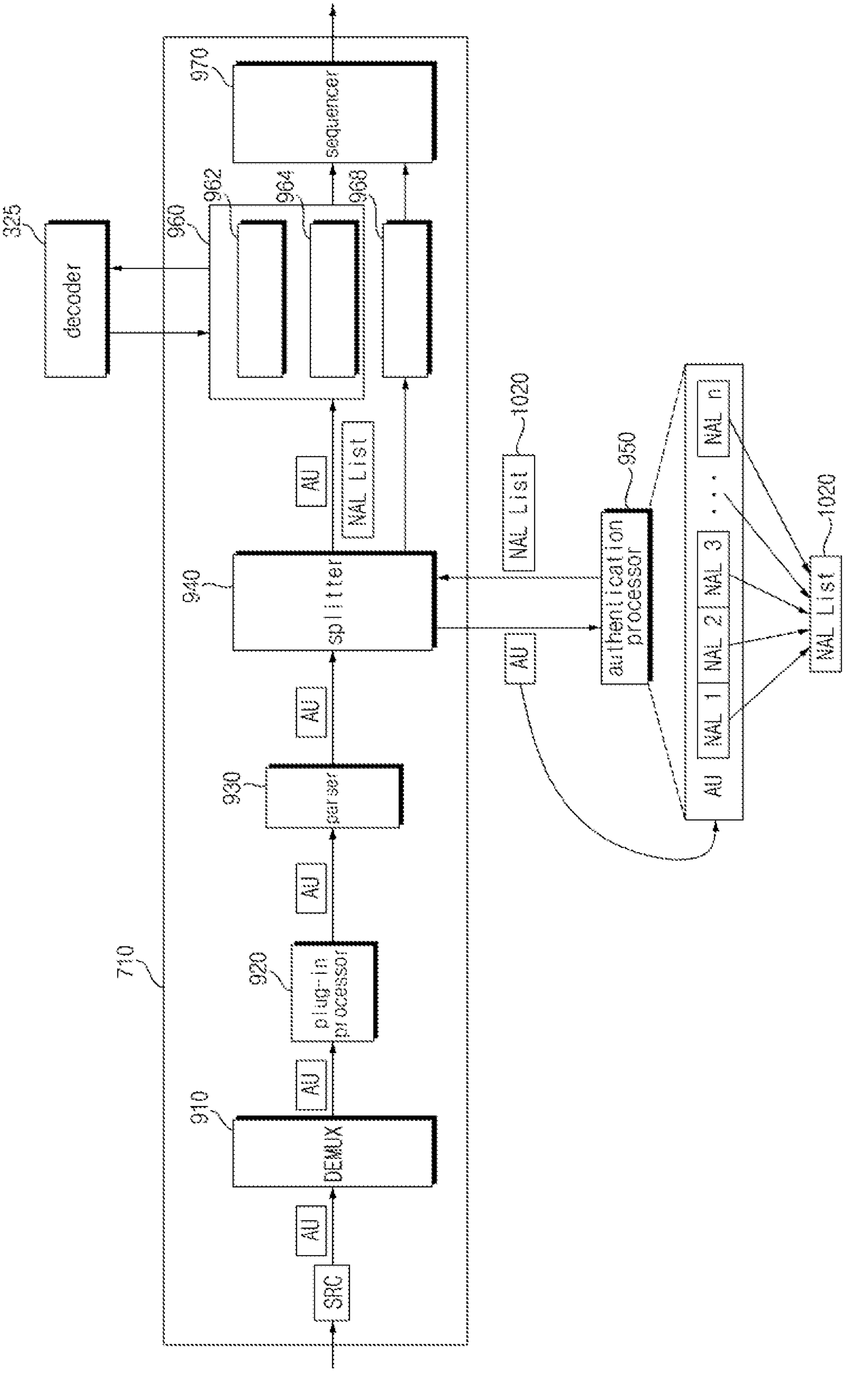

FIG. 14 is a diagram referenced for describing the operation of the streaming data processor 710 of FIG. 9.

Referring to the figure, the streaming data processor 710 receives streaming data SRC.

The demultiplexer 910 in the streaming data processor 710 demultiplexes the second unit of data. Accordingly, the second unit of image data or the address information AU of the second unit of image data may be output.

Meanwhile, the plug-in processor 920 in the streaming data processor 710 may receive the address information AU of the second unit of image data, and perform plug-in processing on the second unit of image data based on the address information AU of the second unit of image data.

Meanwhile, the image parser 930 in the streaming data processor 710 receives the address information AU of the second unit of data from the plug-in processor 920 and performs parsing on the second unit of data based on the address information AU of the second unit of data.

Meanwhile, the splitter 940 in the streaming data processor 710 receives the address information AU of the second unit of data from the image parser 930, and split the second unit of data into image data, meta data, etc. using the address information AU of the second unit of data.

Meanwhile, the splitter 940 in the streaming data processor 710 may receive the address information AU of the second unit of data from the image parser 930, transmit the address information AU of the second unit of data to the authentication processor 950, and receive the list information 1020 from the authentication processor 950.

The authentication processor 950 may receive the address information AU of the second unit of data from the splitter 940, extract the plurality of first units of data NAL1 to NALn from the second unit of data, and generate the list information 1020 including information on the plurality of first units of data NAL1 to NALn.

As described above, the list information 1020 may include number information of the first units of data, address information of the first units of data, and length information of the first units of data.

Meanwhile, the list information 1020 may further include maximum number information and type information of the first units of data.

Meanwhile, the splitter 940 in the streaming data processor 710 may split the image data, metadata, and the like based on the list information 1020 received from the authentication processor 950.

At this time, the splitter 940 in the streaming data processor 710 may output the image data or the address information of the image data in the form of list information 1020.

Meanwhile, the splitter 940 in the streaming data processor 710 may output metadata or address information of the metadata in the form of list information 1020.

Meanwhile, the first video decoding processor 962 and the second video decoding processor 964 in the decoding processor 960 in the streaming data processor 710 may each receive the list information 1020 from the splitter 940, transmit the list information 1020 to the decoder 325, and receive a plurality of first units of decoded image data from the decoder 325.

At this time, since the single list information 1020 is transmitted between the decoding processor 960 and the decoder 325, rather than being transmitted for each of the plurality of first units of image data or the address information NAL1 to NALn of the plurality of first units of image data, the number of IPCs is significantly reduced.

For example, communication between the streaming data processor 710 and the decoder 325 may be performed once per image frame of the streaming data because only one list information 1020 needs to be transmitted.

Accordingly, it is possible to significantly reduce the number of IPCs during signal processing of the streaming data. In particular, it is possible to significantly reduce the number of IPCs when the list information 1020 is output, compared to a case in which the address information of the plurality of first units of data is output to the decoder 325. Accordingly, it is possible to reduce screen interruption when displaying an image based on the streaming data.

Meanwhile, the data parser 968 in the streaming data processor 710 may receive the address information on the meta data from the splitter 940 and parse the meta data based on the address information on the meta data.

Meanwhile, the sequencer 970 in the streaming data processor 710 outputs the data decoded by the decoding processor 960 and the meta data together.

Meanwhile, data and metadata decoded by the decoding processor 960 may be input to the image quality processor 635 of FIG. 10 and used for image quality processing.

While the disclosure has been described with reference to the embodiments, the disclosure is not limited to the above-described specific embodiments, and it will be understood by those skilled in the related art that various modifications and variations may be made without departing from the scope of the disclosure as defined by the appended claims, as well as these modifications and variations should not be understood separately from the technical spirit and prospect of the disclosure.

What is claimed is:

1. A signal processing device comprising:

a streaming data processor configured to receive streaming data, generate list information including information on a plurality of first units of data based on the received streaming data, and output the generated list information;

a decoder configured to receive the list information and decode the plurality of first units of data based on the list information;

a memory configured to store the streaming data, wherein the streaming data processor is configured to output data decoded by the decoder, wherein the list information is transmitted from the streaming data processor to the decoder, wherein the decoder is configured to, based on the list information, access the plurality of first units of data in the memory and decode the plurality of first units of data.

2. The signal processing device of claim 1, wherein the decoder is configured to decode the plurality of first units of data related to the streaming data based on the information on the first units of data in the list information.

3. The signal processing device of claim 1, wherein the decoder is configured to split the streaming data from the memory into the first units of data based on number information and address information of the first units of data in the list information and decode the plurality of first units of data based on the split first units of data.

4. The signal processing device of claim 1, further comprising:

a memory configured to store the first units of data related to the streaming data, wherein the decoder is configured to access the first units of data corresponding to the memory based on number information and address information of the first units of data in the list information and decode the plurality of first units of data based on the accessed first units of data.

5. A signal processing device comprising:

a streaming data processor configured to receive streaming data, generate list information including information on a plurality of first units of data based on the received streaming data, and output the generated list information; and a decoder configured to receive the list information and decode the plurality of first units of data based on the list information, wherein the streaming data processor is configured to output data decoded by the decoder, and wherein the information on the plurality of first units of data includes number information, address information, and length information of the first units of data.

6. The signal processing device of claim 5, wherein the information on the plurality of first units of data further includes maximum number information and type information of the first units of data.

7. The signal processing device of claim 1, wherein the streaming data processor is configured to extract the plurality of first units of data by parsing a second unit of data greater than the first unit, and generate the list information including the information on the plurality of first units of data.

8. The signal processing device of claim 1, wherein the streaming data processor is configured to convert the first units of data into parameter information and transmit update information of the list information and the parameter information to the decoder.

9. The signal processing device of claim 1, wherein the streaming data processor is configured to update at least a portion of the list information with parameter information and transmit the updated parameter information, as the list information, to the decoder.

10. A signal processing device comprising:
- a streaming data processor configured to receive streaming data, generate list information including information on a plurality of first units of data based on the received streaming data, and output the generated list information; and
- a decoder configured to receive the list information and decode the plurality of first units of data based on the list information,
- wherein the streaming data processor is configured to output data decoded by the decoder, and
- wherein the streaming data processor includes an authentication processor configured to receive address information of a second unit of data greater than the first unit, extract the plurality of first units of data based on address information of the second unit of data, and generate the list information including information on the plurality of first units of data.

11. The signal processing device of claim 10, wherein the authentication processor is configured to perform authentication on the streaming data and output the list information after performing the authentication.

12. The signal processing device of claim 10, wherein the streaming data processor further includes:
- a splitter configured to split image data and meta data from the second unit of data based on the list information from the authentication processor; and
- an image decoding processor configured to decode the image data split by the splitter using the decoder.

13. The signal processing device of claim 12, wherein the streaming data processor further includes:
- a data parser configured to parse the meta data using address information of the meta data split by the splitter; and
- a sequencer configured to output the image data decoded by the image decoding processor and the meta data parsed by the parser together.

14. The signal processing device of claim 10, wherein the streaming data processor further includes:
- a demultiplexer configured to demultiplex the input streaming data and output the demultiplexed second unit of data;
- a plug-in processor configured to perform plug-in processing on the second unit of data from the demultiplexer; and
- a parser configured to receive address information of the second unit of data from the plug-in processor and perform parsing on the second unit of data based on the address information of the second unit of data.

15. The signal processing device of claim 1, wherein the number of communications between the streaming data processor and the decoder is inversely proportional to the number of first units of data in the list information.

16. A signal processing device comprising:
- a streaming data processor configured to receive streaming data, generate list information including information on a plurality of first units of data based on the received streaming data, and output the generated list information;
- a memory configured to store the first units of data related to the streamlining data; and
- a decoder configured to receive the list information and decode the plurality of first units of data based on the list information,
- wherein the streaming data processor is configured to output data decoded by the decoder, and
- wherein the streaming data processor includes an authentication processor configured to receive address information of a second unit of data greater than the first unit, extract the plurality of first units of data based on address information of the second unit of data, and generate the list information including information on the plurality of first units of data.

17. The signal processing device of claim 16, wherein the streaming data processor further includes:
- a splitter configured to split image data and meta data from the second unit of data based on the list information from the authentication processor; and
- an image decoding processor configured to decode the image data split by the splitter using the decoder.

18. The signal processing device of claim 17, wherein the streaming data processor further includes:
- a data parser configured to parse the meta data using address information of the meta data split by the splitter; and
- a sequencer configured to output the image data decoded by the image decoding processor and the meta data parsed by the parser together.

19. An image display apparatus comprising:
- a display; and
- a signal processing device configured to control the display,
- wherein the signal processing device comprising:
- a streaming data processor configured to receive streaming data, generate list information including information on a plurality of first units of data based on the received streaming data, and output the generated list information;
- a decoder configured to receive the list information and decode the plurality of first units of data based on the list information; and
- a memory configured to store the streaming data,
- wherein the streaming data processor is configured to output data decoded by the decoder,
- wherein the list information is transmitted from the streaming data processor to the decoder, and
- wherein the decoder is configured to, based on the list information, access the plurality of first units of data in the memory and decode the plurality of first units of data.

* * * * *